N. O. LINDSTROM & C. F. E. OLOFSON.
ELECTRIC ELEVATOR CONTROL SYSTEM.
APPLICATION FILED SEPT. 1, 1914.

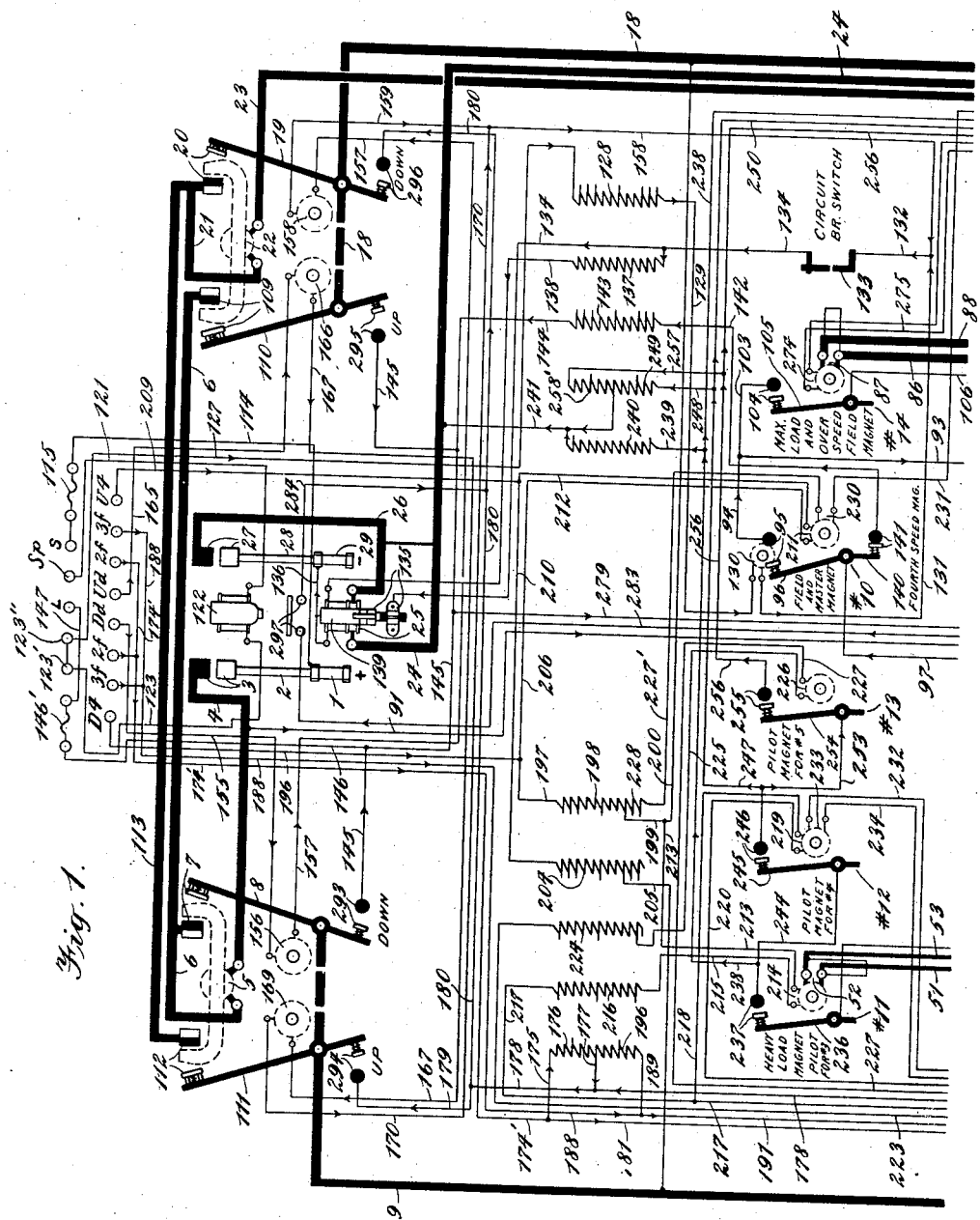

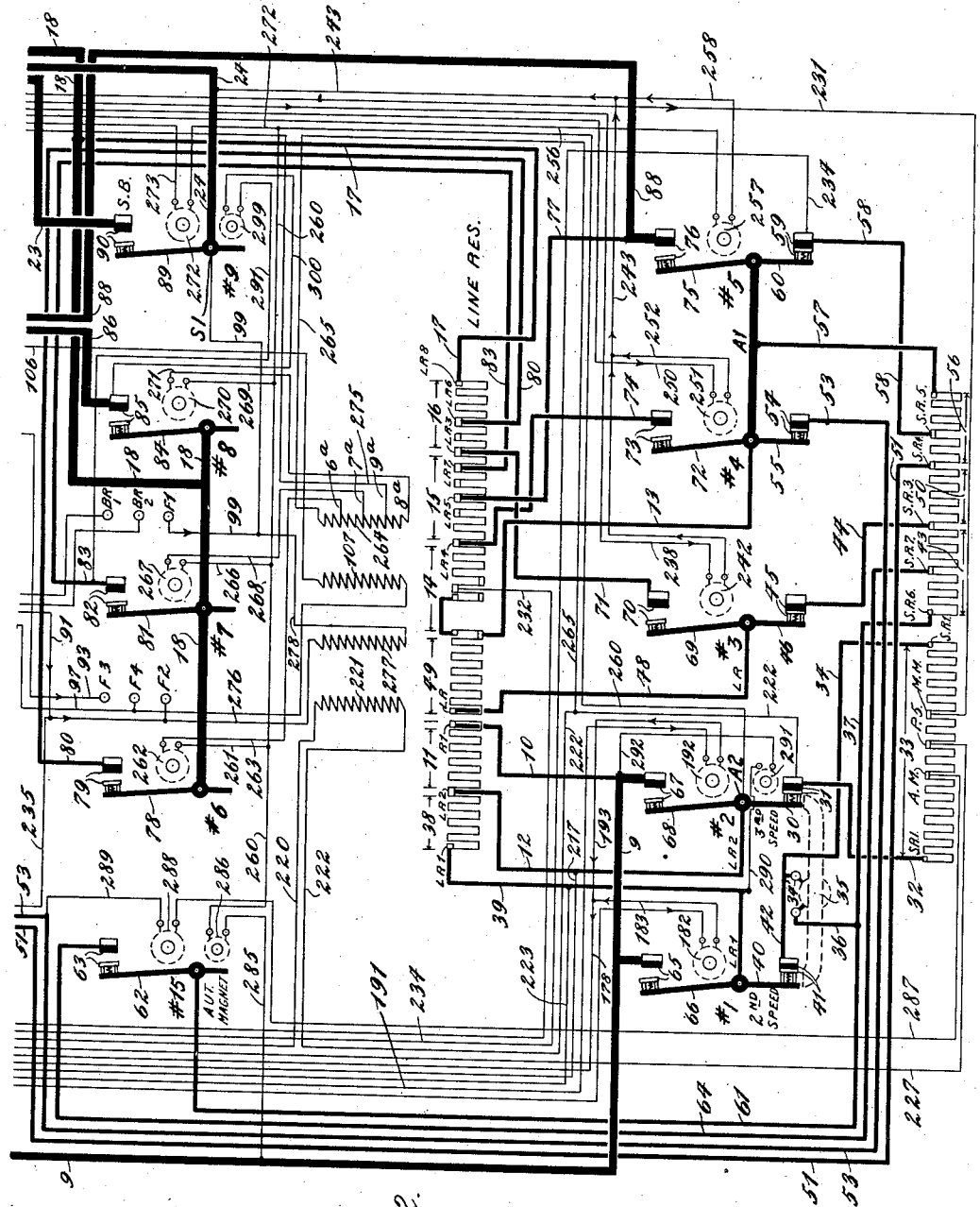

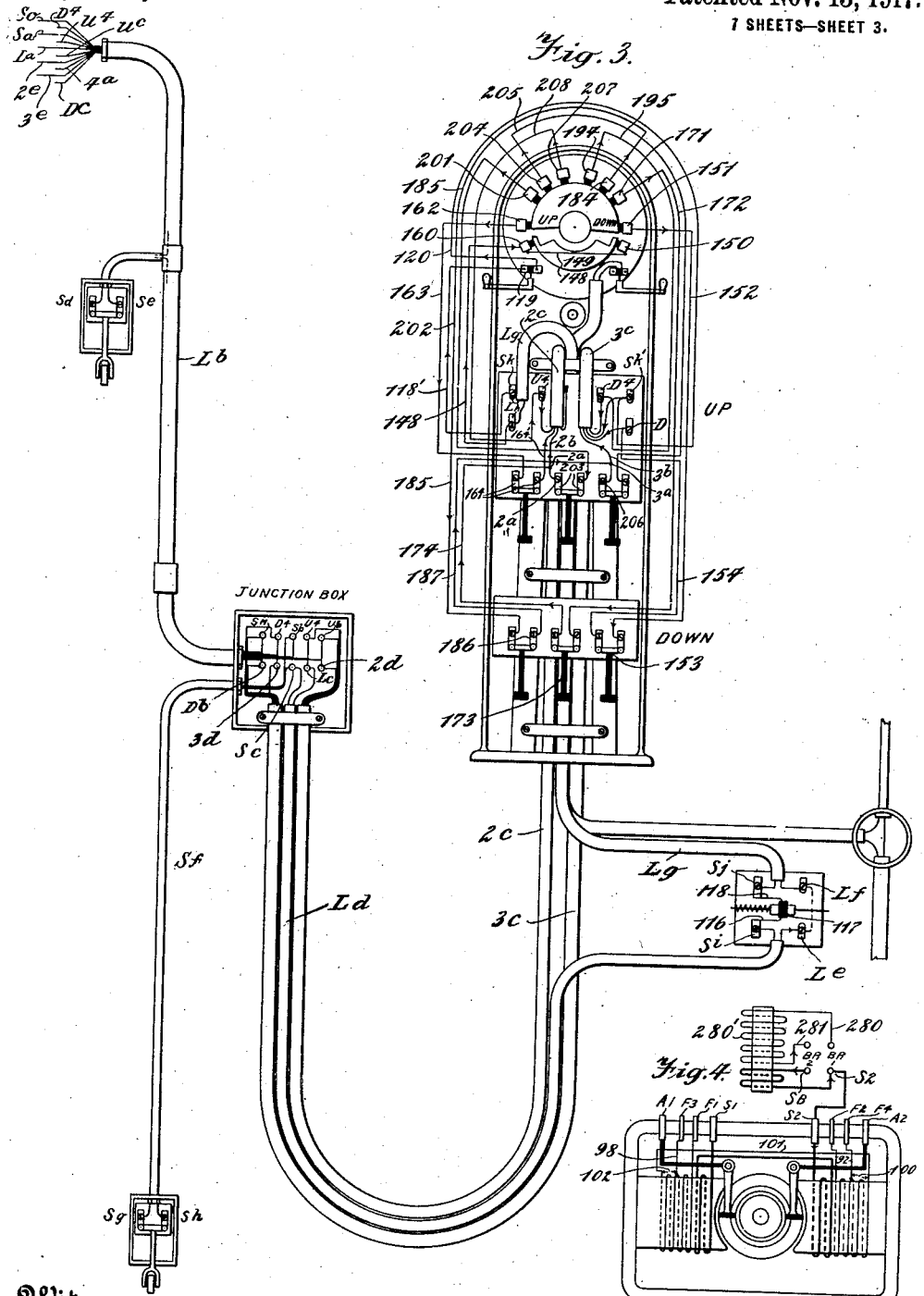

1,246,623.

Patented Nov. 13, 1917.
7 SHEETS—SHEET 4.

Witnesses:

Inventors
Nils O. Lindstrom
Carl F. E. Olofson
By their Attorneys
Rosenbaum, Stockbridge & Ross N. O. LINDSTROM & C. F. E. OLOFSON.
ELECTRIC ELEVATOR CONTROL SYSTEM.
APPLICATION FILED SEPT. 1, 1914.

1,246,623.

Patented Nov. 13, 1917.
7 SHEETS—SHEET 5.

Witnesses:
Geo. C. Cheney
Henry Mosley

Inventors
Nils O. Lindstrom
Carl F. E. Olofson
By their Attorneys
Rosenbaum, Stockbridge & Boast N. O. LINDSTROM & C. F. E. OLOFSON.
ELECTRIC ELEVATOR CONTROL SYSTEM.
APPLICATION FILED SEPT. 1, 1914.
1,246,623.
Patented Nov. 13, 1917.
7 SHEETS—SHEET 6.
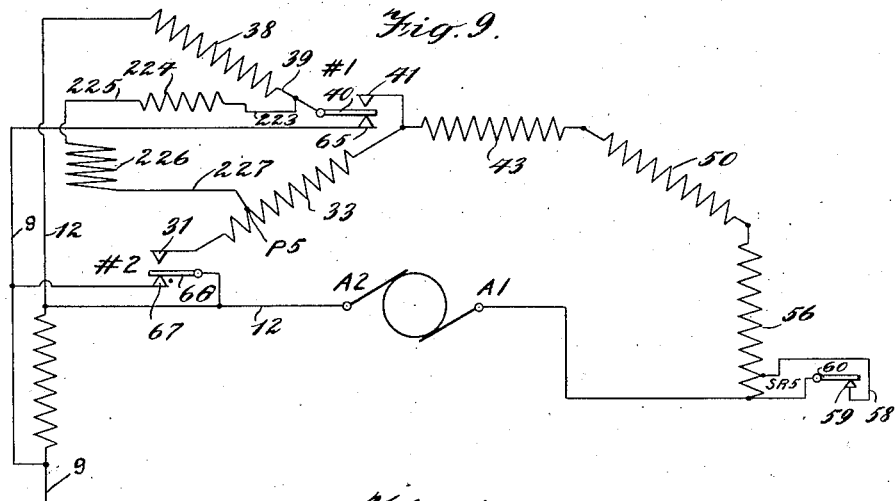
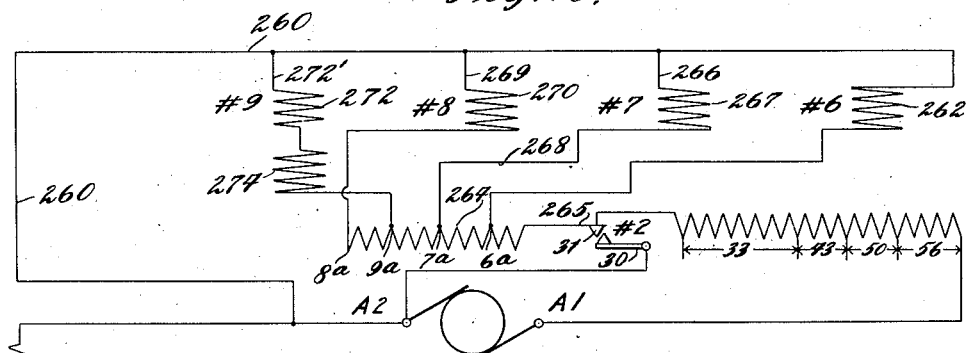
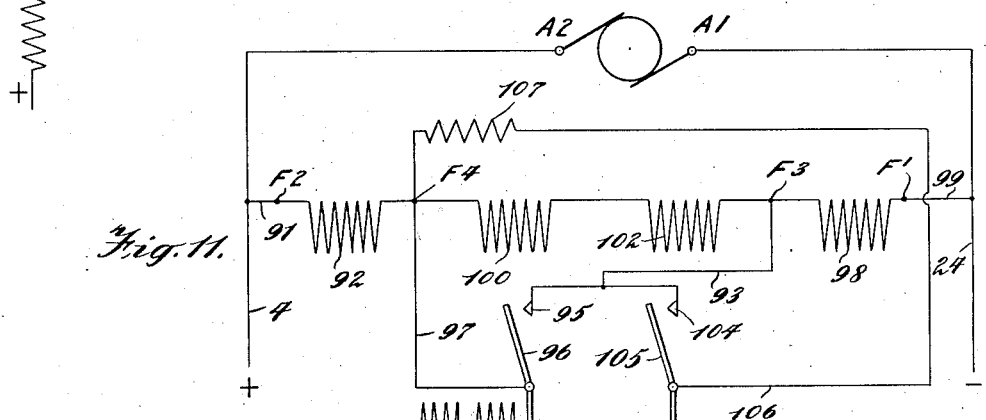
Witnesses:
Geo. C. Cheney
Henry Moxley
Inventors
Nils O. Lindstrom
Carl F. E. Olofson
By their Attorneys
Rasenbaum, Stockbridge & Cox N. O. LINDSTROM & C. F. E. OLOFSON.
ELECTRIC ELEVATOR CONTROL SYSTEM.
APPLICATION FILED SEPT. 1, 1914.

1,246,623.

Patented Nov. 13, 1917.
7 SHEETS—SHEET 7.

Witnesses:
Inventors
Nils O. Lindstrom
Carl F. E. Olofson
By their Attorneys
Rosenbaum, Stockbridge & Bort

UNITED STATES PATENT OFFICE.

NILS O. LINDSTROM, OF NUTLEY, AND CARL F. E. OLOFSON, OF JERSEY CITY, NEW JERSEY, ASSIGNORS TO ALONSO B. SEE, OF BROOKLYN, NEW YORK.

ELECTRIC ELEVATOR-CONTROL SYSTEM.

1,246,623.

Specification of Letters Patent.

Patented Nov. 13, 1917.

Application filed September 1, 1914. Serial No. 859,591.

*To all whom it may concern:*

Be it known that we, NILS O. LINDSTROM and CARL F. E. OLOFSON, a citizen of the United States, and a subject of the King of Sweden, respectively, residing at Nutley, in the county of Essex and State of New Jersey, and Jersey City, in the county of Hudson and State of New Jersey, respectively, have invented certain new and useful Improvements in Electric Elevator-Control Systems, of which the following is a full, clear, and exact description.

The invention relates to electric elevator control systems and has for its primary object the provision of a system which, while the major changes of speed of the motor are controlled from the car, is semi-automatic in its operation to insure a gradual starting or stopping of the car under varying load conditions.

Another object of the invention is to provide a system having a dynamic brake circuit for effecting the stopping of the car, and in which the motor cannot be run at its higher speeds unless the dynamic brake circuit is intact. Another object of the invention is to provide a series of switches for controlling a line and a dynamic brake circuit for the motor, which switches are controlled in part by the manually controlled switch of the car and in part by switches automatically controlled by the variations of the load on the motor. Another object of the invention is to provide a system in which a plurality of switches control the line and dynamic brake circuits and in which the connections for actuating said switches are such that the switches may be only actuated successively and in a predetermined order, and in which the rapidity of the operation of the switches depends upon the load upon the motor.

Still another object of the invention is to provide a system having a line circuit and a dynamic brake circuit and connections for including a resistance in one or other of these circuits. Still another object of the invention is to provide a circuit breaker which is controlled by the current flowing through the main line and connections associated with said circuit breaker, so that upon the actuation of the same the system will be inoperative until the actuation of a switch which is under the direct control of the operator in the car. Other objects of the invention will be apparent from the detailed description and will be particularly pointed out in the appended claims.

In the accompanying drawings,

Figures 1 and 2 are diagrammatic views of the circuit arrangements of the system, Fig. 2 being a continuation of Fig. 1.

Fig. 3 is a diagrammatic view of the car switch and connections from the same, which are adapted to be connected to the circuit arrangements shown in Fig. 1.

Fig. 4 is a diagrammatic view of the motor and brake coils, showing the terminals which are adapted to be connected to the main circuit arrangement shown in Figs. 1 and 2.

Fig. 9 is a simplified diagram of the pilot switch for switch No. 5.

Fig. 10 is a simplified diagram of the controlling circuits for switches 6, 7, 8 and 9.

Fig. 11 is a simplified diagram of the circuit connections to the field and master magnet, and the maximum load and overspeed field magnet showing the same.

Figure 5:
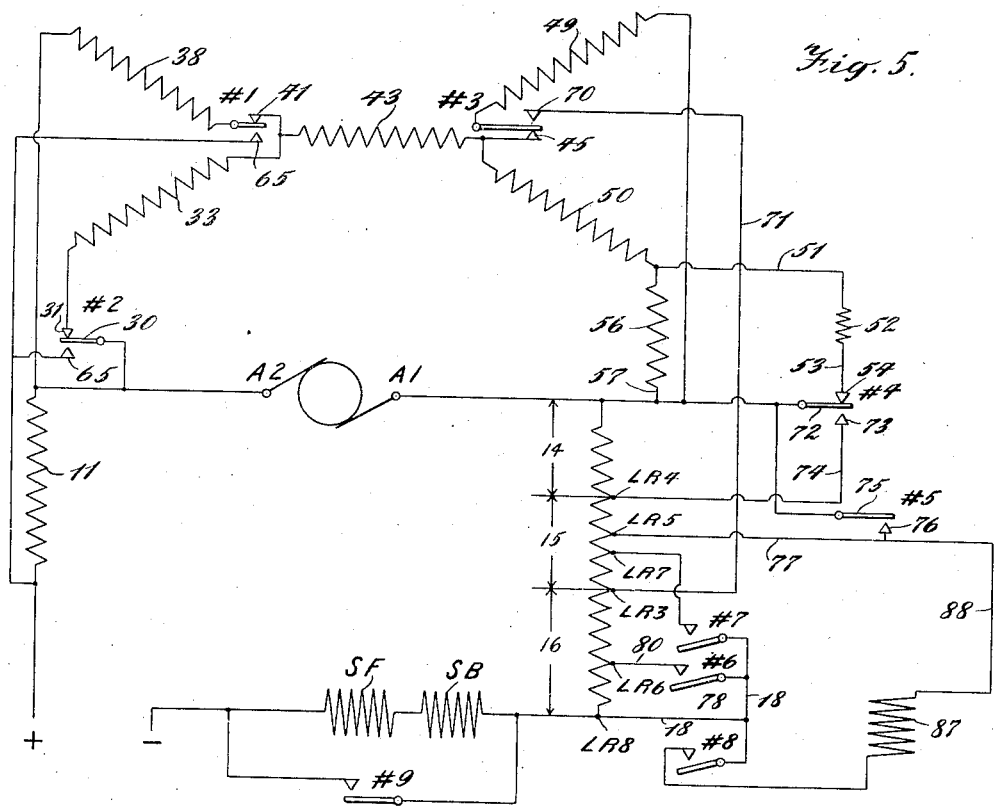
Fig. 5 is a simplified diagram of the line circuit and the dynamic brake circuit, together with the switches for controlling the same.

In the acompanying drawings Figs. 1 and 2, in which Fig. 2 is a continuation of Fig. 1, show a main arrangement of circuits and switches which are adapted to be placed upon a switchboard in a manner usual in elevator controlling systems of this character, the switchboard being usually placed adjacent the hoisting motor, and Figs. 3 and 4 show the connections from the car switch and the motor, which are adapted to be connected to terminals on the switchboard, as will be hereinafter described.

The various elements which constitute the system are well known, *per se*, and form no part of the present invention, for which reason they will not be described in detail, but in order to clearly bring out the various circuit arrangements which form the features of the invention, the operation of the elevator system will be described and the various circuits for controlling the motor, traced in detail.

*Controlling circuit for first speed of the motor.*

Assume that the car is at rest and it is desired to operate the motor so that the car will move downwardly, the load in the car being such that the motor is taking current from the line, and also assume that the circuit breaker and car switch are in their normal position. Referring now to Fig. 3, a rotary contact or segment 149 is shown, which is the controlling segment in a car switch and is adapted to be actuated by the usual form of handle used for car controllers of the ordinary character used in elevator controlling systems. For the first speed downward the rotary contact 149 is moved to bridge stationary contacts 150 and 151 in the car controller, the result of which is the closing of a circuit which operates the electromagnetically controlled "down" switches 8 and 19 positioned on the switchboard and shown in Fig. 1. Tracing this circuit in detail the same starts from the positive side of the line through which the current is supplied to the switchboard, and passes through the fuse 1, lead 2, to the contacts 3 of the main circuit breaker, to wire 4, wire 91, to terminal $F^2$ (shown in Fig. 2). From here the circuit passes to the terminal $F^2$ of the motor shown in Fig. 4, passing through the shunt field winding 92 to terminal $F^4$ of the motor, and then to the correspondingly marked terminal $F^4$ on the switchboard, shown in Fig. 2, through wire 97, switch arm 140 of the field and master magnet for switch 10, contact 141, wire 142, resistance 143, wires 144, 145 and 146, fuse 146′, wire 147 to the terminal marked L at the top of the switchboard (shown in Fig. 1). From here the circuit passes to the wire the end of which is marked $L^a$, which leads to the car switch and is shown on Fig. 3 of the drawing, to the pipe $L^b$, to the terminal $L^c$ in the junction box, through the cable $L^d$ to terminals $L^e$ and $L^f$ in the safety switch, to cable $L^g$, to terminal $L^h$ in the controller box, wire 148 and contact segment 149, to contact 150. The rotary contact 149 bridges contact 150 with contact 151, the circuit continuing through wire 152, limit switch 153, through wire 154 to a terminal marked D, to cable $3^c$, to terminal $D^b$ in the junction box, through pipe $L^b$, to terminal $D^c$, which is adapted to be connected with the terminal $D^d$ on the switchboard shown at the top of Fig. 1. From here the circuit passes through wire 155, coil 156, wire 157, coil 158, wires 159, and 132, to the circuit breaker switch 133, wire 134, contacts 135 to wire 136, fuse 29 to the negative side of the line. The limit switch 153 which has been referred to in the tracing of this circuit is of the usual form for limit switches used in elevator systems of this character and is adapted to be actuated by an obstacle in the shaft of the elevator to break the circuit at the termination of the down movement of the car, the use of such limit switches being common, and need not be further described.

The circuit traced also passes through contacts 135 which are controlled by the overload magnet of the main circuit breaker, and the function of these contacts will be hereinafter referred to.

The current flowing through this circuit energizes the coils 156 and 158 and causes them to attract their armatures 8 and 19 to close the main line circuit through the armature of the motor.

*Line circuit for motor armature.*

The actuation of switches 8 and 19 closes a circuit to the motor armature, which starts from the positive side of the line, as before, and passes through fuse 1, lead 2, contacts 3 of the circuit breaker, wire 4, blow-out coil 5, wire 6, contacts 7, armature 8 of one of the "down" switches, wires 9 and 10, to the point marked $R^1$ on the bank of resistances shown in the middle of Fig. 2, and then through resistance 11, to wire 12, to the terminal marked $A^2$. This terminal is adapted to be connected with the correspondingly marked terminal $A^2$ on the motor, shown in Fig. 4, and the circuit is continued through the armature of the motor, to the terminal designated $A^1$ on the motor, which is connected to the correspondingly marked terminal on Fig. 2 of the drawing. The circuit continues through wire 13, resistances 14, 15 and 16, in series, to the junction point marked $LR^5$, at the end of resistances 16, through wires 17 and 18, to the switch-arm 19 of the other "down" switch, contacts 20, wire 21, blow-out coil 22, wire 23 to the terminal marked SB, which is shown in the upper righthand corner of Fig. 2. This terminal is connected to the correspondingly marked terminal on Fig. 4 of the drawings, the circuit continuing through the series coil of the brake magnet to the terminal $S^2$ on the motor, through the series field of the motor to the terminal $S^1$, which terminal is connected to the terminal $S^1$ shown on Fig. 2 of the drawings immediately below the terminal SB, to wire 24, through the low resistance winding 25 of the overload magnet of the main circuit breaker, wire 26, contacts 27 of the circuit breaker, lead 28 and fuse 29, to the negative side of the line.

Referring now to the simplified diagram shown in Fig. 5, which gives this main line circuit independently of the other circuits of the system, the circuit just traced may be followed, starting from the plus side of the line, passing through resistance 11, through the armature of the motor, resistances 14, 15 and 16 in series, through the brake coil and series field to the negative side of the line. It will therefore be seen that the line current through the line circuit at the starting of the motor passes through a series of resistances which will prevent a surge or inrush of current to the motor armature, as is essential in the starting of motors of this character.

Dynamic brake circuit.

In the normal position of the switches there is also closed a dynamic brake circuit which is bridged across the motor terminals and is adapted to prevent the motor from speeding up when the load in the car is such that the motor is being driven as a generator by the load, i. e., will prevent the motor from speeding up during the low or first speed of the same. This circuit, since it is bridged across the armature terminals, starts from terminal $A^2$ shown in Fig. 2 of the drawing, and since the switches 1 and 2 are in their normal or deënergized position, will have two parallel branches, one branch passing from $A^2$ to switch arm 30 of switch No. 2, contacts 31, wire 32, resistance 33, wire 34 to a common terminal 34′ on a blow-out coil 35, the other parallel branch passing from $A^2$, as before, through wire 12, resistance 38, wire 39, switch arm 40 of switch No. 1, contacts 41, wire 42, to the common terminal 34′ on the blow-out coil 35. The parallel branches unite at this point and pass in common through the blow-out coil 35, wires 36 and 37 to terminal designated $SR^6$ at the end of the resistance 43, through this resistance to terminal $SR^3$. At this point the circuit again divides, one parallel branch passing through wire 44, contact 45, switch arm 46 of switch No. 3, wire 48, resistance 49, wire 13, to armature terminal $A^1$ on the opposite side of the armature. The other parallel branch instead of taking the path through wire 44, continues on through resistance 50 to terminal $SR^4$, through wire 51, low resistance coil 52 of switch No. 11, which has been designated the heavy load magnet or pilot magnet for switch No. 3, and will hereinafter be described in detail, through wire 53, contacts 54, switch-arm 55 of switch No. 4, to armature terminal $A^1$.

Referring to the simplified diagram shown in Fig. 5 it will be seen that the circuits just traced comprise two parallel branches 33 and 38, which branches are controlled by switches No. 2 and No. 1, and are connected in series with a resistance 43, the circuit again branching at the other end of resistance 43 to form two parallel circuits, including resistances 49 and 50, which are respectively controlled by switches Nos. 3 and 4. This arrangement of the dynamic braking circuit provides a short circuit across the armature terminals through which the current which is generated by the counter-E. M. F. may pass when the same is acting as a generator, and will therefore serve as an efficient brake to insure that the motor will not speed up should the same be driven by the load in the car.

Controlling circuit for second speed of the motor.

For the second speed the car switch is again actuated to move the rotary contact 149 in a position to bridge contacts 150 and 171, which closes a circuit for actuating switch No. 1. This circuit parts from the positive side of the line and is identical with the controlling circuit for the first speed of the motor, to the contact 150 in the car switch. From here the circuit is completed through contact 171, wire 172, limit switch 173, wire 174 to a common terminal $2^a$ for the circuits for both the up and down movements of the car, to the wire $2^b$, cable $2^c$, to terminal $2^d$ in the junction box, pipe $L^b$ to a terminal marked $2^e$, which terminal is adapted to be connected with either of the terminals marked $2^f$, on the top of the switchboard shown in Fig. 1, the circuit continuing through wire 174′, wire 175, resistance 176, wires 177 and 178, wire 180, contacts 296 of switch-arm 19, which are closed after the switch arm 19 has been actuated, wire 21, blow-out coil 22, wire 23, to the terminal SB, the current continuing through the series brake coil and series field shown in Fig. 4, back to the terminal SI on the switchboard, through wire 24, coil 25, wire 26, contacts 27 of the circuit breaker, to the negative side of the line. A parallel circuit is also closed from wire 174′, which circuit passes down wire 181 to coil 182, which energizes switch No. 1, wire 183, back to wire 178, which joins the circuit just traced.

When switch No. 1 is closed the circuit controlled by switch-arm 40 and contacts 41 is opened, while the circuit controlled by switch arm 66 and contacts 65 is closed. The resistance 38, which was previously included in one of the parallel branches of the dynamic brake circuit on the first speed of the motor will, in consequence, be disconnected therefrom, and connected in parallel with the resistance 11 of the main line circuit. The main line circuit will, therefore, after passing down along the main wire 9, divide at switch No. 1, and part of the current will pass, as before, through wire 10, resistance 11, to armature terminal A², but another part will pass through contact 65, switch-arm 66 of switch No. 1, wire 39, resistance 38, wire 12, to the armature A². From this point the main line circuit remains the same as in the first speed. Since the parallel branch of the dynamic brake circuit, which includes resistance 38, is controlled by switch-arm 40, the same will be disconnected from the dynamic brake circuit. The changes in the dynamic and line circuits for the second speed of the motor will be clear from the simplified diagram shown in Fig. 5.

The particular arrangement of the dynamic and line circuits described is of particular importance and forms one of the important features of the invention. By utilizing a dynamic brake circuit having parallel branches it is evident that the current passing through any of the branches which must necessarily be controlled by a switch, will not be of sufficient strength to heat the contacts of the switch, as might occur if the dynamic resistances were arranged in series and a heavy counter-E. M. F. permitted to pass through a single switch. This parallel arrangement also insures that the switches for controlling the dynamic brake circuit may be opened and closed without destructive arcing. Another important feature is that one of the parallel branches may be disconnected from the dynamic brake circuit and connected in parallel with the main line circuit without cutting out the entire dynamic brake circuit, which decreases the total amount of resistance required for the system and insures that the current through the line circuit will not be increased until the dynamic brake circuit is weakened, thereby avoiding an unnecessary waste of current.

*Controlling circuit for third speed of the motor.*

For the third speed downward of the car the segment or rotary contact 149 bridges contact 184, which closes a circuit for actuating switch No. 2. This control circuit is identical with the control circuit for the first and second speeds to contact 150, and passes through the rotary contact 149, contact 184, wire 185, contacts 186 of the limit switch wire 187 to a common terminal 3ª for the circuits for both the up and down movements of the car. The current then passes to the common wire 3ᵇ, through cable 3ᶜ to the terminal 3ᵈ in the junction box, to pipe Lᵇ, to terminal 3ᵉ to either of the terminals 3ᶠ, at the top of the switchboard (shown in Fig. 1) wire 188 where the circuit divides, one branch passing through wire 189, resistance 196, wires 177 and 178, and the other branch continuing downwardly through wire 191, coil 192, wire 193, which is joined to wire 178. The circuit continues over wire 180, to switch-arm 19 of the down switch and from this point on is identical with the controlling circuit for the second speed. The actuation of switch No. 2 completes a circuit through contact 67 and armature 68, and opens a circuit between contact 31 and switch-arm 30. The breaking of the circuit at contact 31 and switch-arm 30 disconnects the remaining branch of the dynamic brake circuit, which includes the resistance 33 from the armature terminal A². The entire dynamic brake circuit is therefore thrown out of action and the motor is permitted to speed up without the retarding influence of the brake circuit. The closing of the circuit between the contacts 67 and switch-arm 68 controls the closing of the switches Nos. 3, 4, 5, 6, 7, 8 and 9, which are successively actuated in the order named.

The effect which the closing of each of these switches has on the line circuit will first be described, and thereafter the control circuits for each of these switches traced in detail.

The closing of switch No. 2 short circuits the resistances 38 and 11, which in the second speed of the motor, are in parallel, since the line circuit which, in the second speed, passed along wire 9, to contact 65 and switch-arm 66, to the resistances 38, etc., may now pass along wire 9 to contacts 67 and switch-arm 68, directly to the armature terminal A². The closing of switch No. 3 places the resistance 49 of the dynamic brake circuit in parallel with the resistance 14 and 15, included in series in the main line circuit. Since switch-arm 69 and switch No. 3 are connected by wire 48 to the point LR on the resistance 49 and contacts 70 are connected by means of wire 71 to the point LR³ on resistance 16, the line circuit which has heretofore passed from armature terminal A¹, wire 13, through resistances 14, 15 and 16, etc., will therefore have a parallel branch which divides, after passing through wire 13, and continues through resistance 49, wire 48, switch No. 3, wire 71, to resistance 16, and where it again joins the line circuit heretofore traced, passing through resistance 16 in series. The effect of providing these two parallel branches is therefore to increase the strength of current which passes through the line circuit. The closing of switch No. 4 will short circuit resistance 14, since contact 73 is connected by means of wire 74 to the point LR⁴ on the resistance 14, and the line circuit continuing through the armature to A¹ will therefore, instead of passing over wire 13 to resistances 14, 15 and 16, pass from armature terminal $A^1$ through switch-arm 72 for switch No. 4, contact 73, wire 74, to point $LR^4$, and then through resistances 15 and 16, short-circuiting, however, the resistance 14. Resistance 49 remains in parallel to resistance 15 and the two parallel branches unite at the point $LR^3$ and continue in series through resistance 16 to the negative side of the line, as before. In the same manner, the closing of switch No. 5 whose contact 76 is connected by means of wire 77 to the point $LR^5$, short circuits a part of the resistance 15, and the line circuit continuing from armature terminal $A^1$, will pass directly to switch arm 75 to switch No. 5, contact 76, wire 77, to the point $LR^5$, and then through a part of resistance 15 to the point $LR^3$. The parallel branch through resistance 49 unites with this circuit at this point and the two pass in series through resistance 16 to the negative side of the line. The closing of switch No. 6, which is connected by means of wire 80 to the point $LR^6$ situated midway in the resistance 16, will short-circuit the part of the resistance 16 between the points $LR^6$ and $LR^8$, the parallel branch through resistance 49 uniting with this circuit at the point $LR^3$ and passing in series through the part of the resistance 16 located between $LR^3$ and $LR^6$, where the circuit instead of passing through the remaining portion of the resistance 16, continues through wire 17, wire 80 to the switch contact 79, switch-arm 78 of switch No. 6, to the main wire 18 of the line circuit, from which point the line circuit remains the same as before. The closing of switch No. 7 will short circuit the portion of the resistances 15 and 16 which lie between the points $LR^6$ and $LR^7$. One branch of the line circuit continues from armature terminal $A^1$, to wire 13, through resistance 49, wire 48 to switch-arm 69 of switch No. 3, contact 70, wire 71, to the point $LR^3$, as before, and then through a portion of the resistance 15 positioned between $LR^3$ and $LR^7$, and from there through wire 83 to switch contact 82, switch arm 81 of switch No. 7, to lead wire 18 of the main line circuit. Another branch passes from armature terminal $A^1$, through switch-arm 75 of switch No. 5, contact 76, wire 77, to the point $LR^5$ on resistance 15, and through the part of the resistance 15 lying between $LR^5$ and $LR^7$, to wire 83 where it unites with the parallel branch through resistance 49. A third parallel circuit will also be closed from $A^1$, through wire 13, resistance 49, wire 48, armature 69 of switch No. 3, wire 71, to the point $LR^3$ on resistance 16, through the part of resistance 16 between $LR^3$ and $LR^6$, wire 80, contact 79, switch-arm 78 of switch No. 6, to the lead 18 and the negative side of the line. The closing of switch No. 8 short circuits resistances 14, 15, 49 and 16 as an entirety and the main line circuit then passes from armature terminal $A^1$ to switch-arm 75 of switch No. 5, contact 76, wire 88, coil 87 of the maximum load and over speed field magnet which has been designated switch No. 14, and will be hereinafter referred to, wire 86, contacts 85, switch-arm 84 of switch No. 8, wire 18, and then as before, to the negative side of the line. The closing of switch No. 9 short circuits the series winding of the motor and brake, or in other words, short circuits the compounding effect of the motor, which will weaken the field of the motor and hence increase the speed thereof, as the line circuit which heretofore has flowed along wire 23 to the terminal marked SB on the switchboard and then through the series brake and series field, will, when the switch-arm 89 is actuated, pass directly to the point $S^1$ where the line circuit will continue as before, through wire 24. The effect of closing these switches successively in the order given, is to gradually cut down the resistance of the main line circuit so that the current which is supplied to the armature of the motor will be gradually increased and the motor permitted to have a gradual increase of speed without any liability of an inrush of current through the armature. In other words, one of the functions of switches 3 to 9 inclusive, is to gradually cut down the starting resistance in the main line circuit, which is essential in elevator systems of this character. Part of these switches are also used to control the dynamic brake circuit, as will be hereinafter described.

*Operating circuits for switches 3, 4 and 5.*

Referring to Figs. 1 and 2 of the drawing, it will be seen that switches 3, 4 and 5 are controlled by coils 242, 251 and 257 respectively, so that upon energization of these coils the switches will be closed. The circuits for these coils are in turn controlled by auxiliary switches which have been designated switches 11, 12 and 13 respectively, switch 11 controlling the circuit for switch No. 3, switch No. 12 for switch No. 4, and switch No. 13 for switch No. 5. On the closing of the auxiliary switch No. 11 a circuit will be closed from the positive side of the line, through fuse 1, lead 2, contacts 3 of the circuit breaker, wire 4, wire 91, wire 235 to switch-arm 236 of switch No. 11, to contact 237, wire 238, at which point the circuit divides, one branch passing through wire 239, resistance 240, wire 241, to wire 24, the other branch passing down along wire 238 to coil 242 of switch No. 3, wire 243, to wire 24, where it unites with its parallel branch and the common circuit passes through the low resistance coil 25 of the circuit breaker, wire 26, contacts 27 of the circuit breaker, lead 28, fuse 29, to the negative side of the line.

Switch No. 4 is controlled by coil 251 which is connected in a parallel circuit extending from the contact 237 of switch No. 11 or pilot magnet of switch No. 3, and continues over wire 244, to switch-arm 245 of switch No. 12, that is, pilot magnet of switch No. 4. The circuit continues through contact 246, wire 247, where the circuit again divides, one branch passing along wire 248, resistance 249, to wire 241, to wire 24, and then to the negative side of the line, as in the previous circuit traced, while the other branch passes down along wire 247, wire 250, coil 251, wire 252, wire 243, to the main wire 24, where it passes to the negative side of the line, as before. The circuit for switch No. 5 is in the same manner controlled from contact 246 of switch No. 12, that is, pilot magnet for switch No. 4, where the circuit continues from these contacts over wire 253 to arm 254 of switch No. 13, that is, pilot magnet for switch No. 5, contact 255, wire 256, where the circuit divides, one branch passing through wire 257, resistance 258', wire 241, to the main line, wire 24 on the negative side of the line, while the other branch continues over wire 256, coil 257, of switch No. 5, wire 258, wire 243, which connects to the main wire 24 on the negative side of the line, as in the previous circuits.

Figure 6:
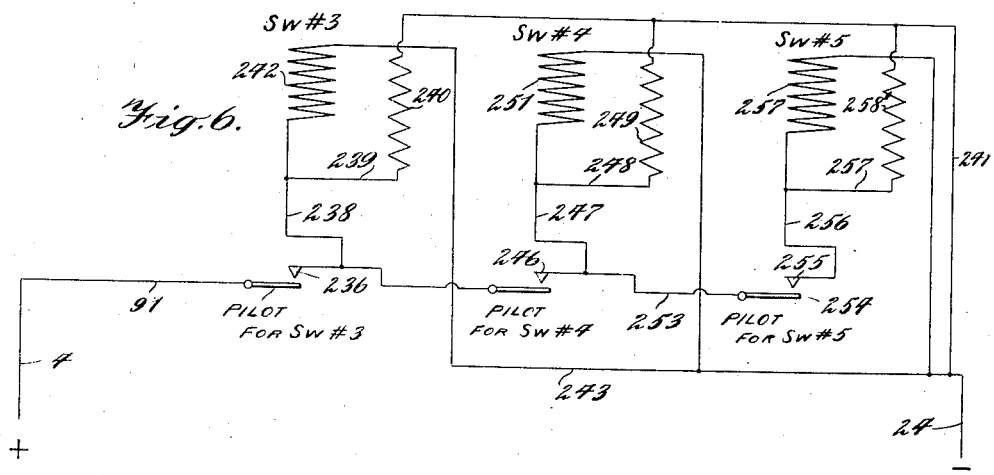
Fig. 6 is a simplified diagram of the circuits for the switches which have been designated 3, 4 and 5.

Referring now to the simplified diagram shown in Fig. 6, and tracing these circuits on the same, it will be seen that the terminal wires 91 and 241 and 243 of the circuits just traced, are directly connected to the main line wires 4 and 24 between the sources of supply and the up and down switches, for which reason the direction of current through these circuits will remain the same on both the up and down movement of the car. It will be clearly seen from this diagram, that the coil 251 of switch No. 4, cannot be energized until switch No. 3 has been actuated, and in the same manner coil 257 of the switch No. 5, cannot be actuated until the pilot magnet for switch No. 4 has been closed, which will insure that these switches will close successively and in the order named, to gradually cut out the line resistance, as has been described. The operation of these switches, when the car is slowing down, will be hereinafter set out. It will also be apparent from this diagram that each of the coils 242, 251 and 257 have connected in parallel with them, resistances 240, 249 and 258' respectively. These resistances have two functions; first, they serve as retarding coils to prevent the switches, after the controlling circuits have been broken at the auxiliary switches, from returning to their normal position too rapidly, since they retard the flow of inductive current through the circuits, and hence will retain the coils energized for a longer time than if they were not used. The resistances also serve to choke the inductive effect and therefore prevent destructive arcing at the pilot switches when the circuits are broken at these points.

Throughout the description which will be hereinafter given, the resistances which are arranged in parallel with a coil are for the same purpose, and their function will not again be referred to.

*Controlling circuits for switch No. 11.*

Switch No. 11, which has been designated the heavy load magnet or pilot magnet for switch No. 3, has its switch arm 236 controlled by two coils which have been designated 52 and 214, respectively. As has been heretofore described, the low resistance winding coil 52 is connected in series with one of the parallel branches of the dynamic brake circuit, or that branch of the dynamic brake circuit which includes resistance 50. The circuit referred to after passing through resistance 50, continues on through wire 51, to coil 52 and thence to wire 53, to switch No. 4, as has been described.

The high resistance coil 214 and low resistance coil 52 are differentially wound so that when energized they set up an opposing flux. The high resistance winding 214 is connected in circuit with the main line circuit by a branch in parallel to the motor armature which passes from the main line circuit at armature terminal $A^2$, along wire 12, wire 217, resistance 216, wire 215, high resistance winding 214 of the coil, wire 213, wire 200, wire 18, to the negative side of the line.

Figure 7:
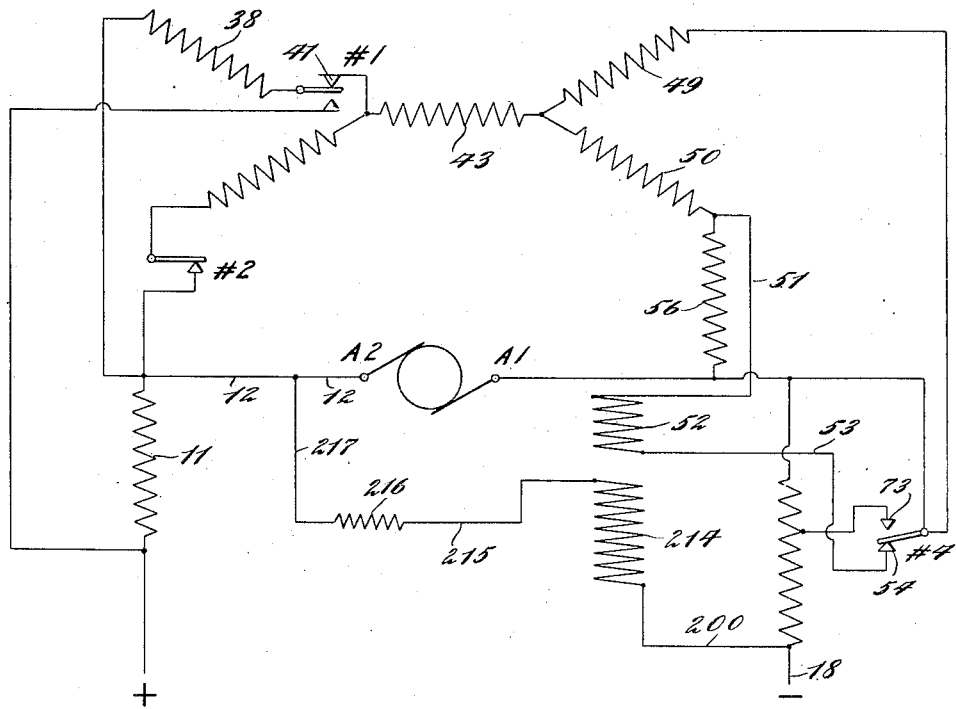
Fig. 7 is a simplified diagram of the controlling circuits for the pilot switch for the main switch 3.

Referring now to the simplified diagram shown in Fig. 7, in which these controlling circuits are shown apart from the remaining circuits of the system, it will be clear that the coil 52, being connected in series with the dynamic brake circuit, depends upon the counter-E. M. F. developed by the motor, while the high resistance winding 214, depends upon the current supplied to the main line. As this switch is not controlled by the car controller and does not depend directly upon the actuation of any of the other switches of the system, but is entirely automatic, its operation will be clearly described.

On the slowest or first speed of the motor, a current is passing through the main line circuit, a portion of which will necessarily pass through the high resistance winding 214 which is in parallel to the main circuit. However, since on the first speed of the motor the resistances 11, 14, 15 and 16 are connected in series with the line circuit, the current which passes through this winding 214 will not be sufficient to energize the same. This is true whether the motor has started to turn or not. Upon the second speed of the motor, switch 1 being actuated to throw resistances 11 and 38 in parallel to each other, the current passing through the main line circuit is increased sufficiently to energize the high resistance winding 214, if the motor has not started to turn, that is, if the motor has not developed a counter-E. M. F. The effect of the closing of switch No. 3 at this time will therefore be to increase the current supplied to the main line, so that the motor armature begins to rotate and take care of the load. It is for this reason that this switch has been designated the heavy load magnet, as it will always insure that even under the heaviest loads the motor will start to turn when the second speed has been reached. However, if upon the actuation of switch No. 2 from the car control, the motor armature has begun to rotate, the counter-E. M. F. developed by the motor will send a current through the dynamic brake circuit which includes the low resistance coil 52. As this coil is wound to oppose the coil 214, switch No. 11 will not be actuated if the motor has begun to rotate at the required speed for which the machine is designed to run, at this speed, and switch No. 11 will therefore not be thrown into action until the operator in the car has actuated his car switch for the third speed.

On the third speed the dynamic brake circuit is broken by switch No. 2, as has been described, and since no current can flow through the low resistance coil 52, the switch No. 11 will always be actuated by the energization of coil 214, when this point has been reached. From the simplified diagram shown, it will also be clear that the coil 214, since it is bridged across the motor terminals, is parallel to the dynamic brake circuit and will also receive current when the motor is turning and developing a counter E. M. F. The importance of this feature will be further described in the slowing-down of the motor.

*Controlling circuit for switch No. 12.*

Switch No. 12, or pilot magnet for switch No. 4, is controlled by means of two high resistance windings 219 and 233 which are cumulatively wound and aid each other in attracting the switch arm 245 to close the circuit at contacts 246.

Figure 8:
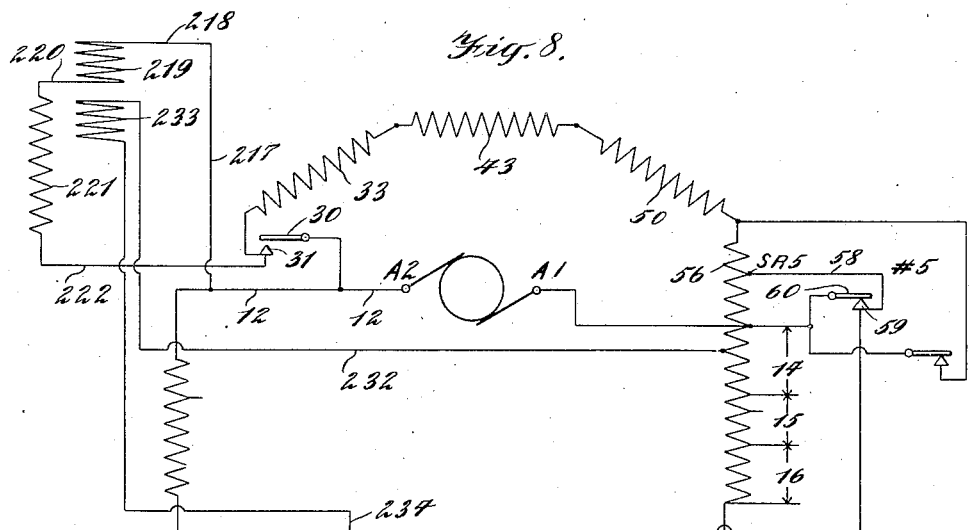
Fig. 8 is a simplified diagram of the controlling circuits for the pilot switch for switch No. 4.

Referring to Figs. 1, 2 and 8, the latter showing a simplified diagram of the control circuits for the switch, it will be seen that the circuit for the winding 219 is connected to the main line and is bridged across the armature terminals by connecting it to a part of the dynamic brake circuit when contacts 31 of switch No. 2 are open. This circuit starts from wire 9 and armature terminal $A^2$ and passes to wire 12, wire 217 and wire 218, coil 219, wire 220, resistance 221, wire 222, contacts 31 which are controlled by switch No. 2, wire 32, resistance 33, wire 34, blow-out coil 35, wires 36 and 37, resistances 43 to 50 and 56, to the point $SR^5$ of resistance 56, wire 58, contacts 59, switch arm 60 of switch No. 5, to the other armature terminal $A^1$ and the negative side of the line. This circuit, since it is bridged across the motor terminals, depends upon the counter E. M. F. developed by the motor, since the higher the E. M. F. of the motor the greater is the amount of current which will pass through the parallel branch. The winding 233 is connected in parallel to the motor armature and serves, when switch No. 5 is closed, to aid the coil 219 in attracting the armature. When the motor is slowing down and switch No. 5 still remains in its attracted position, this circuit is in parallel with a part of the main line and dynamic circuit through portions of resistances 56 and 14, the parallel branch passing through a portion of the resistance 56 to the point $SR^5$, wire 58, to contacts 59 of switch No. 5, wire 234, coil 233, wire 232, to a point on the resistance 14, where it again joins the main line circuit and passes through to the negative side of the line. As soon as switch arm 60 of switch No. 5 makes contact with 59, this circuit is short circuited by the short circuiting of the part of the resistance 56 which is in parallel to it.

*Controlling circuit for switch No. 13.*

Referring again to Figs. 1 and 2 and also to Fig. 9 of the drawings, it will be seen that the pilot magnet for switch No. 5, i. e. switch No. 13, is controlled by a single high resistance coil 226 which is energized from the main line when current is passing through the same by a circuit starting from wire No. 9 and passing to contact 65 of switch No. 1, arm 66 of the switch, wire 39, wire 223, resistance 224, wire 225, winding 226 of the coil, wire 227 to the point $P^5$ on resistance 33, through resistance 33, wire 34, blow out coil 35, wires 36 and 37, resistances 43 and 50 to the point $SR^5$ on resistance 56, wire 58, contacts 59, switch-arm 60 of switch No. 5, and through resistances 15 to 16 to negative side of the line, resistance 14 being short circuited since No. 5 is not actuated until after switch No. 4 has been closed. The current which passes through this circuit depends upon the counter E. M. F. developed by the motor, since the wire 12, switch-arm 66, contact 65 is connected to wire 9, which therefore bridges the coil across the armature terminals and as the counter E. M. F. of the motor increases, since the same will oppose the line current passing through the same and a greater amount of line current will therefore pass through the parallel circuit which includes the coil 226. If no current is passing through the main line and switches No. 2 and 1 have resumed their normal positions, the coil 226 will still be energized by the counter E. M. F. developed by the motor under certain conditions which will be hereinafter brought out more fully in the description of the operation of the system when the motor is slowing down, the coil being bridged across the motor terminals by means of wire 12, switch-arm 30, contacts 31, part of resistance 33 to the point P⁵, wire 227, coil 226, wire 225, resistance 224, wire 223, switch-arm 40 of switch No. 1, contacts 41, resistance 43 and then through resistances 50 and 56 back to the other armature A¹.

*Controlling circuits for switches 6, 7, 8 and 9.*

Referring to Figs. 1 and 2 and Fig. 10 of the drawings, the controlling circuits for switches 6, 7, 8 and 9 are shown, which are closed in the order named to successively short circuit sections of the resistance of the main line, as has been described. The circuit for the coil 262 of switch No. 6 starts from the armature terminal A² and continues over wire 260 and wire 261 to coil 262 of switch No. 6, wire 263 to the point marked 6ᵃ on the resistance 264, wire 265, which is joined to wire 222, and the remaining portion of this circuit continues through contact 31 of switch No. 2, resistance 33, wire 34, coil 35, wires 36 and 37, resistances 43, 50 and 56, to wire 57 and thence to armature terminal A¹, the circuit passing through the entire resistance 56 in this instance, since when switch No. 6 is actuated switch No. 5 is in its closed position so that the connection from wire 58 to contacts 59 and switch arm 60 of switch No. 5, to armature terminal A¹, is opened. It will also be seen that this circuit is closed only after switch No. 2 has been actuated to disengage the contact 31 from switch arm 30 of switch No. 2, as otherwise the circuit would be short circuited by this switch and the circuit would pass directly from armature terminal A² to resistance 33, as has been before described. In the same manner the circuit for coil 267 of switch No. 7 starts from armature terminal A² and passes along wire 260, to wire 266, coil 267, wire 268 to the point marked 7ᵃ on the resistance 264, to wires 265 and 222, to contacts 31, where the circuit continues to the other armature terminal A¹ over the same path as did the circuit for the coil 262 of switch No. 6. Current for the coil 270 of switch No. 8 is also supplied from wire 260 from which the branch wire 269 connects the same with coil 270, the circuit continuing over wire 271 to a point marked 8ᵃ on the resistance 264, and through this resistance to wires 265 and 222 to the other side of the armature as in the preceding circuits. The circuit for coil 272 of switch No. 9 branches from wire 260, passing through wire 272′, coil 272, wire 273, high resistance coil 274 of the maximum load and over speed field magnet which will be hereinafter described in greater detail, to the point marked 9ᵃ on the resistance 264 and through this resistance to contacts 31 and the other armature terminal A¹. It may here be stated that each of these circuits has an additional resistance included in the same so that they will, when energized by the counter E. M. F. developed by the motor, close in the order named. The switch 8, however, is connected to pass through a greater portion of the resistance 264 than is the circuit of the coil 272 of switch No. 9, since this latter circuit also includes in it the high resistance coil 274 of the maximum load and over speed field magnet, which makes this necessary in order that the resistance of the various circuits will be graduated so that the switches will successively close.

*Summation of action of switches for third speed.*

When switch No. 2 has been actuated upon the throwing of the car switch to the third speed position first switch No. 2 throws out the dynamic brake resistance and also increases the current through the line, since resistances 11 and 38 are short circuited. The automatic switch No. 3 which is controlled by auxiliary switch No. 11, is then adapted to be closed only after switch No. 2 has been actuated, if the motor is taking current from the line. If, however, upon throwing the car switch to the second speed the load is so heavy that the armature has not started to turn, switch No. 3 will be actuated before switch No. 2, to start the motor rotating. After the armature has started to rotate the remaining switches 4 and 5 will be actuated as the counter-E. M. F. developed by the motor will be increased, but these switches can only close after switch No. 3 has been actuated. Switches 6, 7, 8 and 9, since their controlling circuits are also bridged across the motor terminals, will then be successively closed to short circuit portions of the line resistance to gradually speed up the motor, the control of each of these switches being dependent upon the counter-E. M. F. developed by the motor.

*Connections for controlling shunt field by master magnet and maximum load and over speed magnet.*

Heretofore, the only circuit described which has passed through the shunt field of the motor has been the controlling circuit which passes through the car switch and through the low resistance field coil 92. The shunt field of the motor, as shown in Fig. 4, of the drawings, comprises two low resistance windings 92 and 98, and high resistance windings 100 and 102, which are energized from a circuit, starting from fuse 1, through lead 2, contacts 3 of the circuit breaker, wire 4, wire 91 to terminal F², shown in the upper portion of Fig. 2, which is adapted to be connected to the correspondingly marked terminal on Fig. 4, through low resistance winding 92, high resistance winding 100, wire 101, high resistance winding 102, low resistance winding 98, to terminal F¹ on the motor and switchboard, to wire 99, to the point marked S¹ on Fig. 2, wire 24, coil 25, wire 26, contacts 27 of the circuit breaker, lead 28, fuse 29 to the negative side of the line. This circuit has been shown on the simplified diagram shown in Fig. 11, from which it will be seen that the shunt winding of the motor as it should be, is connected across the main line circuit, which circuit will be supplied with current as long as there is current flowing in the main line. The high resistance windings 100 and 102 are adapted to be short circuited during the slow speeds of the motor by the field and master magnet, the controlling circuits of which will be hereinafter described, whereby the current which passes through the shunt field will be materially increased, increasing the power which the motor may develop, but decreasing the speed of the same. The field and master magnet which has been designated switch No. 10, is provided with a switch-arm 96 which is connected by the wire 97 to terminal F⁴ on the switchboard, and which is adapted to be connected with the correspondingly marked terminal on the motor. Contact 95 with which the switch arm is adapted to engage, is connected by means of wires 94 and 93 to terminal F³ on the motor and switchboard, so that when this switch is closed wires 97, 94 and 93, together with switch-arm 96 and contacts 95, form a short circuit around the high resistance windings, which is the condition of the shunt field during all speeds of the motor except the highest, as will be hereinafter described. To strengthen the shunt field the maximum load and over speed field magnet is utilized so that on a maximum load where an increase of power is desired the field may be strengthened, or, if the motor is speeding the strengthening of the field will produce a corresponding decrease in speed. This switch has been designated No. 14, and its switch-arm 105 is connected by means of wire 106 and resistance 107, to the motor terminal F⁴, while the corresponding contacts 104 are connected to the common wire 93, by wire 103 which leads to motor terminal F³. It will therefore be seen that when this switch is closed, the resistance 107 is placed in parallel with the high resistance shunt field winding and in series with the low resistance shunt field winding so that there will be a material increase of current passing through the low resistance shunt field winding, which strengthens the same and increases the power of the motor and also decreases its speed.

*Controlling circuits for the field and master magnet.*

Figure 12:
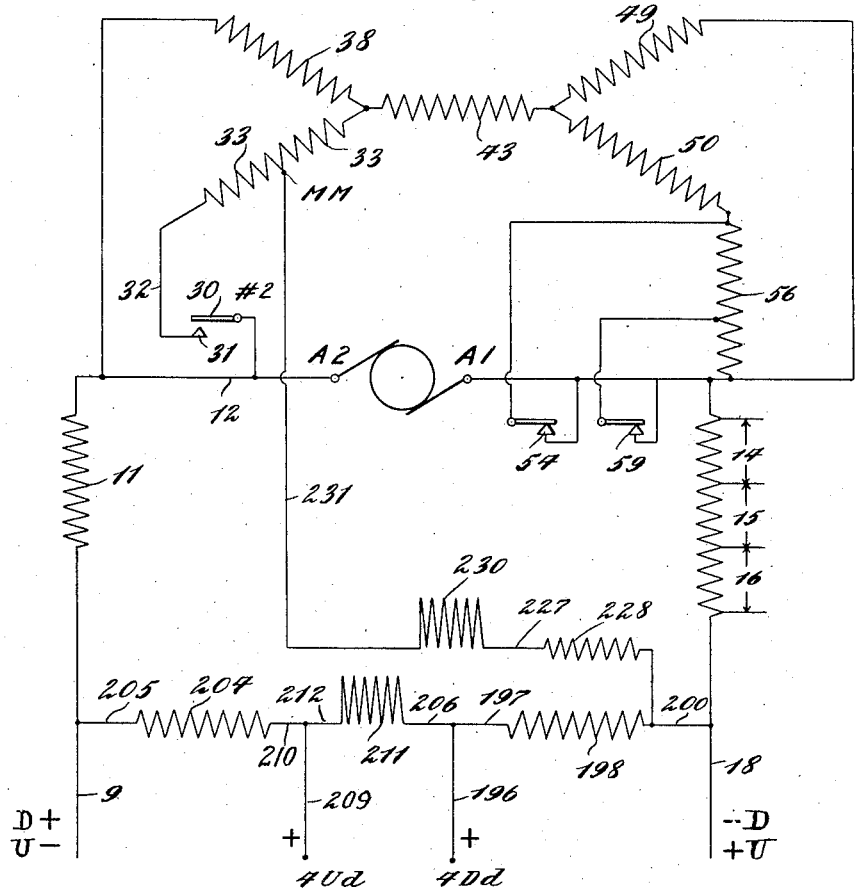
Fig. 12 is a simplified diagram of the controlling circuits for the field and master magnet.
Figure 13:
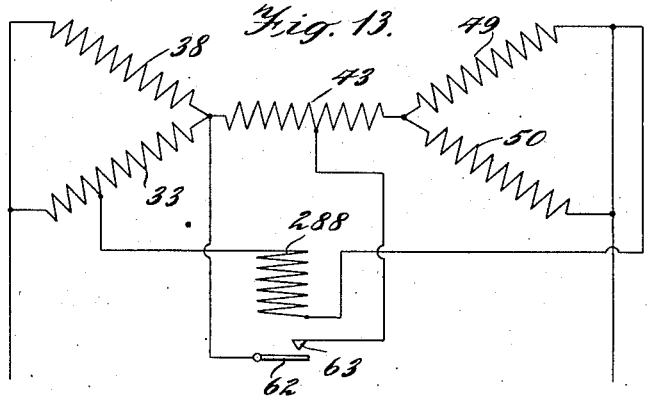
Fig. 13 is a simplified diagram of the controlling circuits for the automatic magnet, which controls a part of the dynamic brake circuit.

Referring to Figs. 1, 2 and 12, it will be seen that the coil for actuating the armature of this magnet is provided with two high resistance windings which are cumulatively wound and designated 211 and 230, respectively. The winding 211 is bridged across the main line circuit, starting from wire 9, and passing through wire 205, resistance 204, wires 210 and 212, coil 211 of the field magnet, wire 206, wire 197, resistance 198, wires 199 and 200, to wire 18, and then following the main line circuit to the negative side of the line. When the car switch is moved to its first, second or third position, since the circuit just traced is in parallel to the main line, there will necessarily be a flow of current to the same which will energize coil 211 to attract the armature of the field and master magnet to its closed position so that the high resistance shunt field windings 100 and 102 will be short circuited and the field of the motor thereby strengthened to supply the additional power to run the motor up to speed. The circuit for the other winding 230 is also in parallel with the main line and dynamic circuits and serves as an aid to attract the armature of the switch 10 when either the motor is slowing down, or if the controller handle should be moved to its fourth speed position so rapidly that the winding 211 has not an opportunity to attract the armature, as will be hereinafter referred to. This circuit starts from the positive line as before, and passes through wire 9, wire 10, resistance 11, wire 12, through switch-arm 30 of switch No. 2, contacts 31, wire 32, through resistance 33 to the point marked MM on the same, wire 231, coil 230, wire 227', resistance 228, wires 199 and 200 to the negative side of the line.

As will be clear from Fig. 12 it will be seen that this circuit receives current as long as the resistances 14, 15 and 16 are in series with the main line circuit, but when these resistances are cut out of circuit by the actuation of switches 3, 4, 5, etc., this circuit will also be short circuited and the magnet 230 deënergized.

As will be hereinafter explained, coil 211 is deënergized mainly from the car switch, and supposing this should occur before the magnets for the third speed position have all been actuated, or in other words, the car switch is thrown suddenly over to its fourth speed position without giving the switches for the other positions time to act, the magnet will, under these circumstances, attract the armature of the field and master magnet until the line resistances 14, 15 and 16 are cut out of circuit, after which time it is unnecessary to hold the field and master magnet in its attracted position, and its armature will break contact and open the short circuit around the high resistance shunt field coils.

The description of the function of magnet 230 and the circuit connections thereto when the car is slowing down, will be hereinafter described in conjunction with this feature of the system.

*Controlling circuits for the fourth speed.*

If the car switch is moved to the fourth or high speed position for downward movement of the car contact 149 will bridge contacts 150 and 194 and the circuit will continue from contact 150 over the circuits previously traced, to contact 194, wire 195 to the terminal $D^4$, cable $3^c$ to terminal $D^4$ in the junction box, through the pipe $L^b$, to terminal $D^4$ at the top of the pipe which is adapted to be connected with the terminal $D^4$ at the top of the switchboard, shown in Fig. 1. The circuit continues down wire 196, wire 197, resistance 198, wire 199, wire 200, to 18, on the negative side of the line, since for the downward movement of the car the "down switches" 8 and 19 are closed, making the main wire 9 the positive side of the line and the wire 18 the negative side of the line. The circuit which passes from terminal $D^4$ to wire 196, wire 197, etc., to the negative side of the line therefore opposes the current passing through the coil 211, as will be clear from Fig. 12, and this winding will therefore become deënergized to permit its armature to resume its normal position, breaking the circuit around the high resistance shunt field windings, and therefore weakening the field to give the desired increase of speed.

The action of the fourth speed is the same for the up movement of the car, which will now be described in detail.

*Controlling circuits for the "up" movement of the car.*

For the first speed up-motion of the car the rotary contact 149 is manually operated in the reverse direction to bridge contacts 160 and 162, which closes a circuit for energizing the "up" switches 110 and 111. This circuit starts from the positive side of the line and follows the same path as the controlling circuit for the "down" movement to wire 148, which is connected to contacts 150 and 160 in parallel. The circuit then continues to contact 149, through contact 162, wire 163, limit switches 164 for the "up" movement of the car, which are similar to the limit switches for the "down" movement, over the wire 164', cable $2^c$, terminal $U^b$ in the junction box, pipe $L^b$ to the terminal $U^c$, which is adapted to be connected with a terminal $U^d$ at the top of the switchboard, the circuit continuing from this point over wire 165, coil 166 of the "up" switch 110, wire 167, to coil 169 of the "up" switch 111, wire 170, wires 158 and 132, contacts 133 of the circuit-breaker switch on the switchboard, wire 134, contacts 135 which are controlled by the overload magnet of the circuit-breaker, wire 136, fuse 29, to the negative side of the line, this circuit being common to the circuit for the "down" movement of the car, over wires 132 and from there to the negative side of the line. The actuation of the switches 110 and 111 closes a main line circuit which starts from the positive source of supply, through the fuse 1, to lead 2, contacts 3 of the main circuit-breaker, lead 4, blow-out coil 5, wire 6, through contacts 109 of the "up" switch, through the switch-arm 110, wire 18, to wire 17, resistances 16, 15 and 14, wire 13, to armature terminal $A^1$, and then through the armature of the motor in the opposite direction to the current which passes through the same on the "down" movement of the car, to armature terminal $A^2$, wire 12, resistance 11, wire 10, wire 9, to switch-arm 111 of the "up" switch, contacts 112, wire 113, wire 21, blow-out coil 22, wire 23, to the terminal marked SB which is connected to the series brake coil, as in the circuit for the "down" movement of the car, to terminal $S^2$ on the motor (see Fig. 4) through the series field in the same direction as in the "down" movement of the car, to terminal $S^1$, which is connected to the correspondingly marked terminal $S^1$ on Fig. 2, the circuit continuing over wire 24, coil 25 of the overload magnet of the main circuit-breaker, wire 26, contact 27 of the circuit-breaker, lead 28, fuse 29, to the negative side of the line. It will be seen from the tracing of this circuit that the current which passes through the armature of the motor has been reversed in direction, while the current which passes through the series brake coils and series field windings is unchanged in direction, which will reverse the direction of rotation of the motor.

The direction through the shunt field of the motor remains the same as for the "down" movement of the car, since, as will be clear from Fig. 11, wire 91 which connects the circuit for the shunt field windings to the system, is connected to the lead wire 4 which remains positive for both the "up" and "down" movements of the car, while the wire 99 which connects the other end of the circuit to the system is connected to wire 24, which remains negative for the main circuits for both the "up" and "down" movements of the car, so that the direction of current through the shunt field remains unchanged.

If the car controller is moved to the second speed "up" movement, contacts 160 and 201 are bridged by a rotary contact 149, and the controlling circuit will then pass to wire 202, contacts 203 of the limit switch to the common terminal 2ª, where the circuit adjoins the controlling circuit for the "down" movement of the car, and is the same as the circuit which has been traced for the energization of coil 182, which will then be energized to close switch No. 1, as has been previously described.

For the third speed "up" movement contacts 160 and 204 are bridged and the current flows from contact 204 to wire 205, limit switch 206, to the common terminal 3ª, from which point the controlling circuit is similar to that traced for the third speed "down" movement of the car, and in the same way switch No. 2 will be actuated.

As will be clear from the simplified diagram shown in Fig. 6, the circuits for the magnets of switches 3, 4 and 5, are connected to the main lead 4 by means of wire 91 and are connected at their other ends to the negative wire 24 of the main line by means of a common wire 243. The current through wires 4 and 24 does not change in direction for the "up" and "down" movements of the car, so that the energization of coils 3, 4 and 5 will be identical for both the "up" and "down" movements. The circuits for the auxiliary switches 11, 12 and 13, that is, pilot magnets for switches Nos. 3, 4 and 5, will be energized in exactly the same manner on the "up" movement of the car since, as will be clear from the simplified diagram shown in Figs. 7, 8 and 9, the direction of current through each of the coils will be reversed.

Referring now to the fourth speed "up" movement of the car, in which contact 207 is electrically connected to contact 160 through rotary contact 149, the current will flow through the controlling circuit as before, to contact 207 and then through wire 208 to terminal U⁴ (see Fig. 3) through cable 2ᶜ, to terminal U⁴ in the junction box, then through the pipe Lᵇ to terminal U⁴ which is adapted to be connected to the terminal U⁴ at the top of Fig. 1, the circuit continuing through wires 209 and 210, resistance 204, wire 205 to wire 9. Referring to the simplified diagram shown in Fig. 12, it will be seen that the positive side of the line is connected through wires 209 and 210, through resistance 204, to the wire 9 which, in the "up" movement of the car, is negative. Since winding 211 is bridged across the main line circuit between wires 9 and 18, and since the current in these wires changes direction on changing from the "down" to the "up" movement of the car, it will be seen that since 9 is now negative and 18 is positive, the current flowing through wire 210 will oppose the current flowing through coil 211 to deënergize the same, similar to the manner which has been described for "down" speed movement of the car to open the short circuit around the high resistance shunt winding of the motor, and to thereby weaken the field to increase the speed of the motor.

*Retarding coil for switch No. 2.*

In order to prevent the actuation of switch No. 2 until switch No. 1 has been actuated, which might occur if the car switch were rapidly worked to its third or fourth speed positions, retarding coil 291 is provided. This coil receives its current from the main line branching from the wire 9 and passing through the wire 292, to coil 291, wire 290, which joins with wire 39, being in parallel therefore, with the line resistance 11. This circuit, however, is short-circuited upon the closing of switch No. 1, for when this switch is actuated the current will take the path through the relatively low resistance 38 instead of through the high resistance coil 291, so that the retarding coil only holds the armature of switch No. 2 in its normal position as long as switch No. 1 remains in its normal position.

*Action of switches upon the breaking of the controlling circuits.*—If the controlling circuit for the fourth speed, either "up" or "down" motion, is broken in the car by the operator moving rotary contact 149 either out of contact with contacts 194 or 207, the circuits which oppose the current passing through the winding 211 of switch No. 10, that is, the field and master magnet, will be broken so that coil 211 again is energized from the main line to short-circuit the high resistance shunt field windings to thereby increase the strength of the field and to cut down the speed of the motor. As will be clear from Fig. 3, no limit switch is provided for the fourth speed of the car, but for the first, second and third speeds of the car, upon upward movement of the same, three limit switches are provided, namely, switches 164, 203 and 206, which are adapted to be broken by a device in the shaft of the elevator, as is the common practice, switch 206 controlling the third speed of the motor, switch 203, the second and switch 164 the first, which switches are adapted to be broken as the car completes its "up" movement. In the same manner, limit switches 153, 173 and 186 control the third, second and first speeds of the motor upon "down" movement of the same and are adapted to be actuated to break the control circuits as the car completes its movement in a downward direction.

If the controlling circuit for the third speed is broken either by means of the car switch, which is accomplished by moving rotary contact 149 either out of contact with contacts 205 or 194, or is broken by means of the limit switches 153 or 206, the coil 192 of switch No. 2 is deënergized and this switch resumes its normal position, closing contact between the switch arm 30 and contacts 31 and opening circuit between switch-arm 68 and contact 67. As will be clear from the simplified diagram shown in Fig. 5, the closing of a circuit between switch-arm 30 and contacts 31 will again complete the dynamic brake circuit current passing from armature terminal $A^2$, switch-arm 30, contacts 31, resistances 33, 43, 50 and 56, wire 57, to armature terminal $A^1$, which dynamic brake circuit is of relatively high resistance but will gradually slow down the motor if the counter-E. M. F. developed by the motor is high. As will be clear from the simplified diagram shown in Fig. 10, each of the coils which control switches 6 to 9 inclusive, pass to a common wire 260 and then through the coil of these switches in parallel, to a portion of the resistance 264, to resistance 264, to a common wire 265, and thence to contacts 31, to resistances 33, 43, 50 and 56 to armature terminal $A^1$. Upon the closing of contacts 31 and switch-arm 30, the circuit instead of passing over wire 260 to each of the coils, will therefore pass directly to switch-arm 30 and contacts 31, and thence to the resistances, thereby short-circuiting each of the coils of these switches.

Upon the closing of switch-arm 30 and contacts 31 each of these coils will therefore be deënergized almost simultaneously and the switches will resume their normal positions. The opening of switch No. 9 will break the short circuit around the series brake coil and series field winding, thus introducing more resistance in the line circuit and at the same time increasing the strength of the field to thereby decrease the speed of the motor and increase its power. The opening of switches 6, 7 and 8 will break the short circuit around portions of the resistances 15 and 16 to thereby introduce more resistance in the main line, which will result in a gradual slowing down of the motor.

If the circuit for the third speed should be broken by means of the limit switches rather than by the actuation of the car switch from the fourth to the third speed, it is evident that coil 211 which normally actuates the armature of the field and master magnet, will remain deënergized, since the car switch still remains in a position to oppose any current passing through the same, and it is therefore necessary to energize this switch by means of the coil 230 in order to short-circuit the high resistance field windings of the motor. This is accomplished, since the other winding 230 which actuates switch-arm 96 of the field and master magnet is also in parallel to the line circuit, through a part of the resistance 33 and resistances 14, 15 and 16 respectively. After switch No. 2 has closed and switches 6, 7 and 8 have been opened to include a part of the resistances 14, 15 and 16 in the main line circuit, current will pass through the winding 230 starting from a wire 9, through resistance 11, wire 12, switch-arm 30, contacts 31, wire 32, resistance 33 to the point MM on the same, wire 231, wire 30, wire 227, resistance 228, wires 199 and 200, to wire 18, which coil will then be energized to attract the armature and short-circuit the high resistance shunt field windings, as described, which circuit will remain energized as long as current is supplied to the motor. This coil will also be energized if no current is being supplied to the main line, since the current 230 is bridged across the motor terminals and in parallel to the dynamic brake circuit as will be clear from Fig. 12, which will hold the coil energized as long as the motor is turning and developing a counter E. M. F. Since the lower contacts of the field and master magnet control the contacts 141 in the main controlling circuits which pass to the car switch, the fact that the field and master magnet remains in its attracted position until the motor is stopped, is important since it prevents the motor from again being started until it has come to a full stop. For the third speed of the motor, in slowing down, switch No. 2 and switches 9, 8, 7 and 6 are alone actuated, switches 3, 4 and 5 remaining closed, as will now be described.

Switch No. 3 remains energized since the coil 214 is in parallel with a part of the main line circuit which includes resistances 14, 15 and 16, and will therefore receive sufficient current to maintain it energized. Even if there is no current flowing through the main line, the coil 214 will still remain energized since it is bridged across the armature terminals through the line resistances 14, 15 and 16, as will be clear from Fig. 7, and the counter E. M. F. developed by the motor will therefore send a current through the coil 214 in the same direction as it passes therethrough when it is energized from the line. This feature will be hereinafter referred to. In the same manner coil 233 of switch No. 12, that is, pilot magnet for switch No. 4, receives current from the dynamic circuit, since this circuit is bridged across the dynamic circuit in parallel with a portion of resistances 56 and line resistance 14. The coil 226 of switch No. 13, that is, pilot magnet for switch No. 5, also receives current through a dynamic brake circuit passing from armature $A^2$, wire 12, through resistance 38, wires 39 and 223, resistance 224, wire 225, coil 226, wire 227, to resistance 33, then through resistances 43, 50 and 56 to the other side of the armature, that is $A^1$.

Should the controlling circuits for the second speed be broken either by means of the car switch or by the limit switches, the coil 182 of magnet for switch No. 1, becomes deënergized and the switch-arms 66 and 40 resume their normal position to close contact between switch-arm 40 and contacts 41 to open it between contact 65 and switch-arm 66.

Referring to the simplified diagram shown in Fig. 5, the closing of contacts 41 will disconnect the resistance 38 which, when switch No. 1 is open, is in parallel with the line resistance 11 and again connect it into the dynamic brake circuit and in parallel with resistance 33. The dynamic brake circuit is now strengthened and will give a stronger short circuit effect across the motor armatures where a rapid slowing down of the motor is required, as where the same is being driven as a generator by the load. Switches Nos. 5, 4 and 3 will now resume their normal positions in the order given.

Referring first to the operation of switch No. 5—From the simplified diagram shown in Fig. 9 it is clear that the high resistance coil 226, which controls the pilot magnet for switch No. 5, is bridged across the motor terminals, the circuit passing from terminal $A^2$, through wire 12, to resistance 38, wire 39, wire 223, resistance 224, wire 225, coil 226, wire 227, to the point $P^5$ on resistance 33, and through the dynamic resistances 33, 43, 50 and 56 to the other armature terminal $A^1$. Upon the closing of switch No. 2 the circuit through the coil 226 will still remain energized, although a portion of the dynamic brake circuit current will now pass directly from wire 12 to switch arm 66, contacts 31, to the point $P^5$ on the resistance 33, but there will still be a portion of the current passing through the coil 226, as before described, and meeting the circuit last traced, at the point $P^5$ on resistance 33. The strength of the current passing through the coil is therefore sufficient to maintain switch No. 5 closed until switch No. 1 is actuated. Contacts 41 will then be closed against switch arm 40 and the resistance 38 thrown in parallel with the resistance 33 and in series with the remaining portion of the dynamic brake circuit. Since wire 223 is connected to wire 39 adjacent switch No. 1, the current which has heretofore passed over wire 223 and coil 226 to the point $P^5$ on the resistance 33, will pass directly to the resistance 43, to switch-arm 40, contact 41, short circuiting the coil 226 which, upon deënergization, will permit switch No. 13 to resume its normal position, the effect of which will be to open the short circuit around resistance 14 and a portion of resistance 15, as will be clear from Fig. 5. After switch No. 5 has resumed its normal position then switch No. 4 will also resume its normal position, which will be clear from the simplified diagram shown in Fig. 8 of the drawings. Upon the closing of contacts 31 of switch No. 2, that is, upon the breaking of the switches for the third speed of the motor, the high resistance coil 219 is short circuited but the other high resistance winding 233 is still energized until switch No. 5 has resumed its normal position, so that switch arm 60 is again in contact with contacts 59; but when this occurs the portion of the resistance 56 with which the circuit of the coil 233 is in parallel, will be short circuited, thus cutting off the current which passes through the coil so that it has not sufficient strength to maintain its armature attracted. However, as long as switch No. 5 is in its actuated position, or in other words, until a portion of the resistance 56 is short circuited the current which passes through the coil 233 is sufficient to maintain its armature attracted, so that under no conditions can switch No. 4 resume its normal position until switch No. 5 has been actuated.

Referring now to Fig. 7, which shows the controlling circuit for pilot magnet of switch No. 3—As has been previously described, the high resistance winding 214 of this coil is in parallel with a part of the resistance of the main circuit and current will flow through the same as long as the main line is being supplied. However, coil 52 of this magnet, which is wound to oppose the flux through coil 214, is, upon the switch No. 4 resuming its normal position, connected to the dynamic brake circuit. Since the flux passing through the coil 52 opposes the flux through coil 214, if the dynamic current is strong the coil 52 will nullify the attractive action of coil 214 and switch No. 11 will assume its normal position, breaking the circuit to switch No. 3. If, however, the motor is still receiving a strong line current, as where the load is such that more current is needed to operate the motor, the attractive force of coil 214 will be sufficient to hold the switch No. 11 in its attracted position against the neutralizing action of coil 52, which insures that the motor will not be stopped before the car reaches the desired plane, as might otherwise occur. It will be seen, therefore, that switches 5, 4 and 3 may resume their normal positions only in reverse order to the order in which they are actuated.

Upon the breaking of the control circuits for the first speed either "up" or "down", the coils for the "up" and "down" switches will be deënergized, the switches resuming their normal position and the motor coming

Automatic switch for dynamic brake circuit.

In order to obtain a stronger dynamic braking effect when the motor is slowing down and while it is being driven as a generator by the mechanical load, an automatic switch has been provided which has been designated switch No. 15. This switch is utilized to short circuit a portion of the resistance 43 of the dynamic brake circuit and strengthen the same to increase the dynamic braking effect. The switch-arm 62 of this switch is connected by wires 64 61 and 37 to the point $SR^6$ on the resistance 43 and the contacts 63 of the switch are connected by wire 64 to the point $SR^7$ on the resistance 43 so that upon the closing of the switch the portion of the resistance lying between these two points is short-circuited. A coil 288 is provided for actuating the switch, which coil is connected in circuit parallel to a portion of the dynamic braking resistance, the circuit starting from a point AM on the resistance 33, passing by wire 287 to coil 288, wire 289, wire 53, coil 52, wire 51 to the point $SR^4$ on the dynamic resistance 50. It will therefore be seen that while the dynamic brake circuit is closed this coil will be energized and is dependent upon the counter-E. M. F. developed by the motor which, if the same is sufficiently heavy, will cause the switch to be actuated to strengthen the dynamic brake circuit, as described. In order to prevent this switch from acting while the main line circuit is being supplied with heavy current the retarding coil 286 is used, which receives its current through a circuit in parallel with the main line, the circuit passing from the main line wires 9 and 285 to coil 286, wire 260, to armature terminal $A^2$. This coil is therefore in parallel with the main line resistance 11, and will therefore receive sufficient current to retard the action of the switch when a heavy current is passing through the main line.

Assuming that the car switch has been inadvertently thrown over to its center position from its high speed position or that the circuit breaker is actuated by an overload on the line, it will be evident that unless there were some special control, all of the switches would return to their normal position almost simultaneously and the dynamic brake circuit which would be completed, would be so strong as to stop the motor with a sudden jar or jerk. By the system which has been described, this is prevented since switches 3, 4 and 5 are controlled by the counter E. M. F. developed by the motor and are entirely independent of the actuation of the other switches. If the car switch should be actuated in this manner or the circuit breaker broken, the "up" or "down" switches and switches 1, 2, 6, 7, 8 and 9 would all return to their normal position almost simultaneously. Referring, however, to the simplified diagram shown in Figs. 7, 8 and 9, it will be seen that the coil 214 of pilot for switch No. 3, is bridged across the armature terminals through the line resistances 14, 15 and 16 and this coil will therefore remain energized until switch No. 4 has been actuated to throw the coil 52 into the dynamic brake circuit which will then oppose the flux passing through coil 214 and therefore permit the same to resume its normal position. In the same manner, although the coil 219 of the pilot for switch No. 4 is short circuited by switch No. 2, coil 233 is in parallel to the dynamic brake circuit through a part of resistance 56 and a portion of resistance 14, which will maintain the switch 12, and therefore the switch 4 in actuated position as long as the motor is turning and developing a counter E. M. F. and until switch No 5 has been actuated to short circuit the portion of resistance 56 which will then permit the pilot magnet for switch No. 4 to resume its normal position. And referring to Fig. 9, it will be seen that coil 226 is energized by a circuit bridged across the armature terminals passing from the armature terminal $A^2$ to wire 12, resistance 38, wire 39, wire 223, resistance 224, wire 225, coil 226, wire 227, resistances 33, 43, 50, 56 to the other armature terminal $A^1$, which will maintain the coil 226 energized until switches Nos. 1 and 2 return to their normal position which action short circuits this coil as has been described. When switch No. 5 returns to its normal position, it cuts out a portion of the dynamic brake resistance 56 and switch-arm 4 when it returns to its normal position will cut out the remaining portion of resistance 56, while switch No. 3 will throw resistance 49 in parallel with resistance 50, thus giving a gradual strengthening of the dynamic brake circuit which will gradually slow down the motor and bring the car to a stop without any sudden jars or jerks.

Retarding coil for switch No. 9.

In order to prevent the actuation of switch No. 9 until the entire line resistance has been cut out, since it is desirable that the series field and series brake coil should not be short-circuited until this occurs, a retarding coil 229 is provided for this switch No. 9. This coil is connected in a circuit in parallel with the main line, starting from the point $LR^5$ on resistance 15 and passing over wires 77 and 88 to a low resistance coil 87 of the maximum load and over speed field magnet, which will be hereinafter referred to, wire 86, wire 300, retarding coil 299, wire 298, wire 83 to the point LR⁷ on resistance 15. Since this coil is in circuit with a portion of the line resistance it will retard the action of switch No. 9 until the line resistance has been cut out of circuit, which will prevent a premature closing of the switch to short-circuit the series field and thus increase the speed of the motor.

*Control circuits for maximum load and over speed field magnet.*

As has been heretofore described, and as is clear from Fig. 11 of the drawings, the shunt field of the motor is controlled by a maximum load and over speed field magnet whose armature 105 when actuated, is adapted to close a circuit through a resistance 107, throwing the same in parallel to the high resistance windings of the field and in series with the low resistance windings of the shunt field in order to obtain a stronger field when a maximum load is reached. By strengthening the field in this manner it is also possible to prevent the motor from attaining more than a desired speed. The control circuits for this switch, which has been designated 14, comprise a low and high resistance winding. The low resistance winding is connected in series with the main line circuit when switch No. 8 is closed, which circuit for the "down" movement of the car, continues from A¹ through switch-arm 75 of switch No. 5, contacts 76, wire 88, low resistance coil 87, wire 86, contacts 85 of switch No. 8, switch-arm 84 to wire 18, and then to the negative side of the line. The circuit for the "up" movement of the car is the same except that the direction of the current which flows through the coil 87 is reversed. As has been previously traced, the high resistance coil 274 is connected in series with the coil 272 of switch No. 9 (see Fig. 10 of the drawing) the circuit being supplied from wire 260 which is connected to armature terminal A² through coils 272 and 274, through resistances 33, 43, 50 and 56, to the other armature terminal A¹. The coil 274 is therefore in parallel to the armature through a portion of the dynamic brake resistance and the low resistance coil 87 is connected in series with the main line circuit. These high and low resistance windings or coils are wound in opposite directions and are so proportioned that either winding is sufficiently strong when energized, to attract the armature and close contact between switch arm 105 and contact 104 to strengthen the field of the motor. If, after the line resistance has been cut out the motor begins to operate at too great a speed the high counter E. M. F. developed will pass through the high resistance winding 214 and will energize the same sufficiently to attract its armature to close the switch, and thereby strengthen the field and cut down the speed of the motor. The current through the low resistance winding 87, since the line current when the speed of the motor is high, is invariably light, will not be sufficient to oppose the action of high resistance coil 214, and if the motor has a sufficiently high speed to develop a counter E. M. F. which will reverse the current in the line, the winding 87 will then assist winding 274 since they are now energized to attract their switch arm in the same direction.

If the motor is drawing a heavy line current, the low resistance winding 87 which is in series with the line circuit, will be energized sufficiently to attract the armature to close the switch, thus giving the added strength of field necessary to increase the power of the motor. The opposing flux through the high resistance winding 214 which is bridged across the motor terminal, will not be sufficient to nullify the action of the low resistance coil in this instance, since the counter E. M. F. developed by the motor is small as compared to the heavy line current which is being supplied to the line. It will therefore be seen that this switch is closed either when the motor starts to race or when a heavy load is being carried by the same.

*Brake shunt winding.*—Referring to Fig. 4 of the drawing, it will be seen that the brake coil is supplied with a shunt winding by means of wires 280 and 281, the terminals of which are designated B₂R and B₁R, respectively. This coil is always energized when either the "up" or "down" switches are in their actuated position, or in other words, while the motor is running, in order to remove the brake which is usual with brake constructions of this character.

If the "down" switches 8 and 19 are closed the circuit through the brake shunt winding will start from wire 9 and pass through lower contact 293, wire 145, wire 279, terminal B₁R to the correspondingly marked terminal B₁R on Fig. 4 of the drawing, through the brake shunt winding to terminal B₂R and the correspondingly marked terminal on Fig. 2 of the drawing, through wire 283, switch 297 which is in its closed position, wire 284, wire 180, contacts 296, to switch arm 19 of the other "down" switch on the negative side of the line. If the switches 110 and 111 for the "up" movement of the car are closed the circuit will be the same, passing through contacts 294, wire 179, to wire 180, and then through the circuit as before, thence to wire 184, to contacts 295 to the other side of the line.

The switch 297 is, in so far as the operation of this system is concerned, always in closed position, and no further mention need be made of the same.

Circuit breaker and controlling circuits therefor.

Referring to the top of Fig. 1, a circuit breaker is shown, whose contacts have been designated 3—3 and 27—27 respectively, which contacts are adapted to be opened upon the energization of an overload magnet having a low resistance coil 25 and a high resistance coil 139, and are adapted to be electromagnetically brought back to closed position by the resetting magnet 122. As has been previously traced, the controlling circuits for the "up" and "down" switches 8, 19, 110 and 111 respectively, branch from wire 4 and pass to wire 91, to the field coil 92, to wire 97, to switch-arm 140, contact 141, wire 142, resistance 143, wire 144, wire 145, wire 146, fuse 146' to a terminal marked L at the top of Fig. 1, and then through the controller switch to either of the terminals marked $D^d$ or $U^d$, through the magnets for controlling either the "up" or "down" switches, to a common wire 132, circuit breaker switch 133, wire 134, contacts 135, wire 136, to fuse 29 on the negative side of the line. After the "up" and "down" switches have been actuated to supply line current to the line, the field and master magnet becomes energized, as has been described, so that the control circuit passes from wire 4 to blow-out 5 wire 6 and contacts 7 of switch-arm 8 for the "down" movement of the car, through contacts 293, wire 145, wire 146, fuse 146', to a terminal marked L, and for the "up" movement of the car pass from wire 4 to blow-out coil 5, wire 6, contact 109, switch-arm 110, contacts 295, to wire 145, wire 146, fuse 146' to the terminal marked L, which holds the controlling circuit intact and allows the field and master magnet to be energized without breaking the control circuit. These control circuits, after passing through the car switches return to either of the terminals $D^d$ or $U^d$, shown at the top of Fig. 1, and after passing through the respective coils for the "up" and "down" switches, meet at a common wire 132 and pass over circuit breaker switch 133, wire 134, contacts 135, wire 136, fuse 29 to the negative side of the line. The contacts 135 are controlled by the low resistance winding 25 which is in series with the main line circuit. If an overload current should be supplied to the line the coil 25 will be energized to break circuit between contacts 135, and also to open the circuit breaker for contacts 3—3 and 27—27, thus cutting off the supply of current to the motor. However, a parallel circuit to the controlling line will be closed, branching from wire 134 and passing through resistance 137, wire 138, to high resistance coil 139, wire 136, to the negative side of the line. The current which passes through the high resistance winding 139 and the magnets for the "up" and "down" switches is not sufficient to maintain the switches in their actuated positions, so that the same will fall back to break the controlling circuit. However, a second circuit is closed through the high resistance winding 139, which will maintain this winding in its energized condition to maintain contacts 135 open until a circuit breaker switch is opened and again closed in the car. This circuit starts from the plus side of the line, passes through fuse 1, wire 114, fuse 115, to the terminal marked S, which terminal is connected to a terminal marked $S^a$ on Fig. 3, through the pipe $L^b$ to the terminals $S^d$ and $S^e$ in the switch which controls the furthest movement of the car in an upward direction to terminal $S^b$ in the junction box and also down through pipe $S^f$, to switch terminals $S^g$ and $S^h$ controlling the extreme downward movement of the car back to the terminal $S^c$ in the junction box, and then by means of cable $L^d$ to the terminal $S^i$ in the safety switch, contact 116, contact 117 of the safety switch, terminal $S^j$, cable $L^g$, to terminal $S^k$, then by wire 118' to circuit breaker switch 119 positioned just below the car switch, wire 120, to terminal $S^{k'}$, to cable $3^c$, then by cable $3^c$ to terminal $S^m$ in the junction box, to pipe $L^b$, to terminal $S^o$, which is adapted to be connected with terminal $S^p$, through wire 121, coil 122 of the resetting magnet, wire 123, across terminals 123' and 123'', which are adapted to be connected together and between which some form of governor switch not shown, may be interposed, to wire 127, resistance 128, wire 129, blow-out coil 130, wire 131, where the circuit joins the common wire 132 and passes through circuit breaker switch 133 and wire 134. As contacts 135 are opened the circuit takes the parallel path through resistance 137, wire 138, high resistance coil 139, wire 136, fuse 29, to the negative side of the line. This circuit will, as long as the circuit breaking car switch remains closed, retain the contacts 135 open, but the current which passes through this circuit is not sufficient to energize the resetting magnet 122 to pull the circuit breaker again in. If the circuit breaker switch in the car is opened the circuit through coil 139 will be broken and the contacts 135 allowed to resume their normal position. Upon again closing the circuit breaker switch in the car the resetting magnet 122 will be sufficiently energized to draw in the circuit breaker, since the current may now pass, instead of through high resistance winding 139, directly through contacts 135 and wire 136 to the negative side of the line. The parts will therefore resume their normal position.

Important features of the system.

As is clear from the simplified diagram shown in Fig. 6 et seq., each of the switches which automatically cut in and out the resistances for the third speed of the motor, are controlled through a portion at least of the dynamic brake resistance. The resulting advantage is obvious, for if this resistance should become broken from any cause, then it would be impossible to obtain a higher speed of the motor than the second speed. This is of particular importance, since it will prevent any speeding up of the motor, which would be dangerous when the dynamic brake circuit is broken, as the electro-mechanical brakes with which motors of this type are usually equipped are not sufficiently heavy to depend upon to insure the gradual stopping of the car, especially where the motor is being driven as a generator by a heavy mechanical load. Other important features of the system have been pointed out in detail in the preceding description, some of which, enumerated briefly, are:

A dynamic brake circuit having divided branches, each of which includes a switch which permits the use of comparatively light switches which will actuate more quickly than the heavier ones, for since the circuit is divided, any arcing or destruction of the switches even if the counter-E. M. F. developed by the motor is extremely high, is prevented;

The arrangement of the resistances so that they may be connected either into the dynamic brake circuit or the line circuit;

The arrangement of the shunt field windings and the means by which they are controlled from the car switch in order to obtain the highest speed of the motor, that is, by the field and master magnet and connections;

The control of the shunt field windings by the maximum load and over speed magnet, whereby the torque of the motor may be strengthened on the highest speed if it is carrying a heavy load, or the speed of the motor decreased if it starts to race;

The automatic magnet and the connections thereto, whereby the strength of the dynamic brake circuit may be increased to insure a stopping of the motor when the same is being driven as a generator and developing a high counter-E. M. F.;

The provision of a plurality of switches for controlling the resistance of the line circuit, which switches by their connections, are adapted only to be actuated in a manner to insure a gradual cutting out and in of the line resistance;

The provision of the pilot switches for some of the main switches, which pilot switches by their connections, are controlled in part by the counter-E. M. F. developed by the motor and in part by the strength of the current passing through the line circuit, whereby under varying load conditions the switches will be automatically actuated to insure the cutting in and out of the line resistance at the proper time and not otherwise;

The novel arrangement of the connections for the circuit breaker, whereby the same is controlled from the car and the provision of means whereby the circuit breaker is held open until the means in the car has been actuated;

And various other advantages which will be readily apparent from the preceding detailed description.

All of the advantages above enumerated contribute to produce a system, which, while primarily controlled by a car switch, is semi-automatic in its operation to insure a gradual starting and stopping of the car under the varying conditions of load to which the motor is subjected, and will under all conditions insure a smooth running of the car irrespective of whether the operator manipulates his car switch in a careless manner, or not.

Having thus fully and clearly described our improvements, what we claim as new and desire to secure by Letters Patent, is:

1. In an electric elevator control system, a motor, a line circuit and a dynamic brake circuit therefor, a sectional resistance in series with said line circuit, and a sectional resistance in said brake circuit, a plurality of electro-magnetically operated switches for disconnecting and connecting said resistances with said line circuit, and said dynamic brake circuit, and control circuits for said switches controlled in part by said line circuit and in part by said dynamic brake circuit.

2. In an electric elevator control system, a motor, a line and dynamic brake circuit therefor, means for varying the resistance of said line circuit including a plurality of independent electro-magnetically operated switches, and control circuits for said switches connected to said dynamic brake circuit and controlled in part by said line circuit.

3. In an electric elevator control system, a motor, a line and dynamic brake circuit therefor, means for varying the resistance of said line circuit including a plurality of independent electro-magnetically operated switches, and circuits for controlling said switches connected in series with a part at least of said dynamic brake circuit and controlled in part by said line circuit, 4. In an electric elevator control system, a motor and a line and dynamic brake circuit therefor, means including a plurality of switches for varying the resistance of said line circuit, means controlled by a car switch for controlling some of said switches, and means including circuits connected to the dynamic brake circuit for automatically controlling the other of said switches.

5. In an electric elevator control system, a motor, a line and dynamic brake circuit therefor, a plurality of switches for controlling said circuits, means for controlling some of said switches from the car, pilot switches for controlling a part of the remaining switches, and means for controlling said pilot switches and the rest of the remaining switches in accordance with the load on the motor.

6. In an electric elevator control system, a motor, a line circuit therefor, means including a plurality of switches for controlling the resistance of said line circuit, means for controlling at least two of said switches from the car, and means for increasing the current through said line circuit after the first of said two switches has been actuated and the motor has not started to turn but not until said second of said two switches has actuated if the motor has started to turn.

7. In an electric elevator control system, a motor, a line circuit therefor, means including a plurality of switches for varying the resistance of said line circuit, means for controlling at least two of said switches from the car, and means for actuating another of said switches to decrease the resistance of the line circuit if the motor does not start to turn after the first of the first named switches has been actuated and not until after the second of said first named switches has actuated if the motor has started to turn upon the closing of the first of said first named switches.

8. In an electric elevator control system, a motor, a line circuit therefor, means including at least two switches controlled from the car for increasing the supply of current to the line circuit, means including a switch for also increasing the supply of current to the line controlled by the load on the motor, and means including a plurality of switches for further increasing the line supply, the actuation of said last named switches being dependent upon the actuation of said three first named switches.

9. In an electric elevator control system, a motor, a dynamic brake circuit therefor comprising a plurality of parallel branches connected in series with said motor and switches in at least some of said branches for controlling the making and breaking of said branches, means including a car switch for operating the switch in one of said branches to increase the total resistance of the circuit, and means including a car switch for operating the switch in a branch in parallel to said first named branch for cutting in and out the dynamic brake circuit.

10. In an electric elevator control system, a motor, a line circuit and a dynamic brake circuit adapted to be connected to the armature of said motor, said circuits having resistances therein, and means for disconnecting a part of the resistance from one of said circuits and including it in the other without interrupting the supply of current through said line circuit.

11. In an electric elevator control system, a motor, line and dynamic brake circuits adapted to be connected to the armature of said motor, said dynamic brake circuit comprising a plurality of branches having resistances therein, means for disconnecting one of said branches from the dynamic brake circuit and for connecting it to the line circuit and vice versa without interrupting the supply of current through said line circuit.

12. In an electric elevator control system, a motor, line and dynamic brake circuits adapted to be connected to the armature of said motor, said dynamic brake circuit comprising a plurality of branches having resistances therein, a resistance in said line circuit, and means for disconnecting one of said branches from said dynamic brake circuit and for connecting it in parallel to the resistance in the line circuit.

13. In an electric elevator control system, a motor, a line and a dynamic brake circuit therefor, a sectional resistance in series with said line circuit, a plurality of electro-magnetically operated switches for cutting in and out of said resistance, control circuits one for each of said switches, said control circuits being connected in series with said line circuit and passing through a part at least of said dynamic brake circuit.

14. In an electric elevator control system, a motor having a shunt field, means for controlling said field including an electromagnetically operated switch, a circuit for the magnet of said switch connected to the line, a car switch, and connections from the car switch for weakening the current passing through said magnet.

15. In an electric elevator control system, a motor having a shunt field, an electromagnetically controlled switch and connections therefrom to said shunt field for strengthening the same upon the closing of said switch, said connections being arranged to weaken the current passing through said magnet irrespective of the direction of current in the line, by the actuation of the car switch to different positions.

16. In an electric elevator control system, a motor having a shunt field, means for controlling said field including an electromagnetically operated switch controlled by a coil having two windings, a circuit connecting one of said windings across the line, a dynamic brake circuit across the armature of the motor, and a circuit including the other of said windings adapted to be connected to at least a part of said dynamic brake circuit.

17. In an electric elevator control system, a motor, a shunt field therefor, an electromagnetically controlled switch having connections for shunting a part of the windings of said field, a coil for said switch having two windings, a line circuit for said motor, a circuit for one of said windings bridged across said line circuit, a dynamic brake circuit for said motor, and a circuit for the other of said windings adapted to be connected to said dynamic brake circuit.

18. In an electric elevator control system, a motor, a shunt field therefor, having high and low resistance windings connected in series, an electrically controlled switch and connections therefrom for shunting said high resistance winding, means for normally actuating said switch by the current in the line circuit of the motor, and means controlled by a car switch for preventing the actuating of said switch by said last named means to thereby increase the speed of the motor.

19. In an electric elevator control system, a motor having a shunt field, means for controlling said field including an electromagnetically operated switch adapted to strengthen said field when said switch is closed, a coil for actuating said switch having two windings, a circuit connecting one of said windings across the line, connections including a car switch for deënergizing said winding to increase the speed of the motor, a dynamic brake circuit across the armature terminals of the motor, and a circuit including the other of said windings of said switch connected in parallel with said dynamic brake circuit and adapted to hold said switch open to strengthen the field of the motor when said dynamic brake circuit is closed and the motor is starting or stopping.

20. In an electric elevator control system, a motor having a shunt field, a line and a dynamic brake circuit for said motor, a car switch, a circuit controlled by said car switch, and means controlled by said line circuit, said dynamic brake circuit and said car switch control circuit for weakening and strengthening said field.

21. In an electric elevator control system, a motor having a shunt field, a line circuit, said field having high and low resistance windings, means comprising a switch controlled in part by a car switch and in part by the line circuit for connecting and disconnecting said high resistance winding from said low resistance winding.

22. In an electric elevator control system, a motor, a main line circuit therefor, a shunt field for said motor having high and low resistance windings, a circuit having an electrically operated switch therein for short-circuiting said high resistance winding, a control circuit for said switch in parallel with the main line circuit and normally receiving current therefrom, and circuits controlled by the car switch for opposing the current passing through said control circuit to deënergize said switch and thereby open the short-circuit around the high resistance winding to weaken the field of the motor and increase its speed.

23. In an electric elevator control system, a motor, a main line circuit therefor, a shunt field for said motor having high and low resistance windings, a circuit having an electromagnetically operated switch therein for short-circuiting said high resistance winding, a control circuit having a coil in parallel to the main line circuit, connections to said control circuit on each side of said coil, and connections controlled by the car switches for opposing the current passing through said coil irrespective of a reversal of current in the main line.

24. In an electric elevator control system, a motor, a main line circuit therefor, a shunt field for said motor having high and low resistance windings, a circuit including a resistance in parallel to the high resistance field winding, an electrically operated switch for controlling said circuit, and means controlled by the load on the motor for operating said switch to close said circuit.

25. In an electric elevator control system, a motor, a main line circuit therefor, a shunt field for said motor having high and low resistance field coils, a circuit including a resistance in parallel with said high resistance coil, an electrically operated switch for controlling said circuit, said switch having two windings, one of said windings being controlled by the current passing through the main line circuit, and the other of said windings being controlled by the counter-E. M. F. developed by the motor.

26. In an electric elevator control system, a motor, a shunt field, a car switch, and means controlled by the current supplied to the motor and the car switch for varying the strength of the shunt field while the line circuit is supplying current to the motor and by the counter-E. M. F. developed by the motor while the motor is acting as a generator.

27. In an electric elevator control system, a motor having a shunt field, means for varying the strength of said field controlled in part by a car switch and in part by the counter-E. M. F. developed by the motor, and other means for varying the strength of said field controlled in part by the current supplied to the motor and in part by the counter-E. M. F. developed by the motor.

28. In an electric elevator control system, a motor having a shunt field, means controlled by a car switch for varying the strength of said field, and additional means controlled by the load current and the speed of the motor for also varying the strength of said field.

29. In an electric elevator control system, a motor having a shunt field, means controlled by a car switch for weakening said field, and additional means operable when a maximum load is carried by the motor or when the motor is speeding to automatically strengthen said field after said car switch has been actuated to weaken the same.

30. In an electric elevator control system, a motor having a shunt field, a line circuit for said motor, means including a switch energized from said line circuit for automatically decreasing the resistance of said field to increase the supply of current passing therethrough when current is flowing through said line circuit, and means controlled by a car switch for deënergizing said first named switch to increase the resistance of said field to obtain a higher speed of the motor.

31. In an electric elevator control system, a motor, a line circuit therefor, means for varying the resistance of said circuit, including a main switch, means for controlling said main switch including an electrically controlled pilot switch, and means for controlling said pilot switch in accordance with the load carried by the motor.

32. In an electric elevator control system, a motor, a line circuit therefor, means for varying the resistance of said line circuit including a main switch, means for controlling said main switch including a pilot switch, said pilot switch having a differentially wound coil, a circuit for one winding of said coil bridged across the motor terminals, and a circuit for the other of said windings connected to the line circuit.

33. In an electric elevator control system, a motor, a line circuit therefor, means for varying the resistance of said line circuit, a pilot switch for said switch, said pilot switch having a differentially wound coil comprising a high and low resistance winding, a circuit for said high resistance winding connected to the line circuit, and a circuit for said low resistance winding bridged across the motor terminals.

34. In an electric elevator control system, a motor, a line circuit and a dynamic brake circuit therefor, means for varying the resistance of the line circuit, including a main switch, a pilot switch for said main switch, said pilot switch having a differentially wound coil, a circuit for one winding of said coil in series with said dynamic brake circuit, and a circuit for the other winding of said coil in parallel to the line circuit.

35. In an electric elevator control system, a motor, a line circuit and dynamic brake circuit therefor, means for varying the resistance of said line circuit including a main switch, a pilot switch of said main switch, said pilot switch having a differentially wound coil, a circuit for one winding of said coil in series with the dynamic brake circuit, a second main switch in control of said last named circuit, and circuit connections to said second main switch whereby said switch is only adapted to be actuated after the actuation of said first main switch, a circuit for the other winding of said differentially wound coil connected to the main circuit, whereby said last named coil will attract said pilot switch except when said second main switch is closed when the current passing through said first named coil will nullify the attractive force of said last named coil if the counter-E. M. F. is high and the line current relatively weak.

36. In an electric elevator control system, a motor, a line circuit therefor, means for varying the resistance of said circuit including a main switch, a pilot switch for said main switch having two cumulatively wound windings, a circuit for one of said windings adapted to be bridged across the motor terminals, and a circuit for the other of said windings adapted to be connected to the line circuit.

37. In an electric elevator control system, a motor, a line circuit and dynamic brake circuit therefor, means for varying the resistance of said line circuit including a main switch, a pilot switch for said main switch, having two coils, a circuit for one of said coils adapted to be bridged across the motor terminals, and a circuit for the other of said switches adapted to be connected to the line circuit.

38. In an electric elevator control system, a motor, a line and dynamic brake circuit therefor, means for varying the resistance of said line circuit including a main switch, a pilot switch for said main switch having a coil provided with two windings, means controlled from the elevator car for opening and closing said dynamic brake circuit, a circuit for one of said windings of said coil adapted to be connected to said dynamic brake circuit, and a circuit for the other of said windings adapted to be connected to said main line.

39. In an electric elevator control system, a motor, a line circuit and a dynamic brake circuit therefor, means including a main switch for varying the resistance of said line circuit, a pilot switch for said main switch having two cumulatively wound windings, a circuit for one of said windings in parallel to a portion of said dynamic brake circuit, a second main switch for controlling said last named circuit, a circuit for the other of said windings in parallel with a resistance in said main line, and a switch for short-circuiting said resistance.

40. In an electric elevator control system, a motor, a line circuit and a dynamic brake circuit therefor, means for varying the resistance of said line circuit including a main switch, a pilot switch for said main switch, having one winding, and a circuit for connecting said winding in parallel with a part at least of said dynamic brake circuit.

41. In an electric elevator control system, a motor, a line circuit and a dynamic brake circuit therefor, means for varying the resistance of said line circuit including a main switch, a pilot switch for said main switch having a coil, and a circuit for connecting said coil in parallel to a part at least of said dynamic brake circuit, said brake circuit having two branches between which said circuit is connected.

42. In an electric elevator control system, a motor, a line circuit therefor, means including a plurality of switches for varying the resistance of said line circuit, pilot switches for some of said main switches, and means for actuating said switches in one order as the motor is starting up and in a different order when the motor is stopping.

43. In an electric elevator control system, a motor, a line and dynamic brake circuit therefor, means including a plurality of switches for varying the resistance of said line and dynamic brake circuits, pilot switches for some of said main switches, and means for actuating said switches in one order as the motor is starting and in a different order when the motor is stopping.

44. In an electric elevator control system, a motor, a line circuit therefor, means including a plurality of switches for varying the resistance of said line circuit, means for controlling some of said switches from the car, and means for controlling other of said switches in accordance with the strength of the line current while current is being supplied to the motor and in accordance with the counter-E. M. F. developed by the motor when the motor is acting as a generator.

45. In an electric elevator control system, a motor, a line circuit therefor, means including a plurality of switches for varying the resistance of said line circuit, means for controlling some of said switches from the car, means for controlling other of the remaining switches partially by the E. M. F. developed by the motor and partially by the current in the main line, and means for controlling the rest of said remaining switches by the E. M. F. of the motor alone.

46. In an electric elevator control system, a motor, a line and dynamic brake circuit therefor, means including a plurality of switches for varying the resistances of said line circuit for varying the resistance of said brake circuit and for opening and closing said brake circuit, means for controlling some of said switches from the car, said switches including those which control the dynamic brake circuit, and means for automatically controlling the remainder of said switches in accordance with the load current and counter-E. M. F. of the motor.

47. In an electric elevator control system, a motor, a line circuit and a dynamic brake circuit therefor, means controlled by a car switch for varying the resistance of each of said circuits and for opening and closing the latter circuit, and means automatically controlled by the load on the motor for also varying the resistance of said line circuit.

48. In an electric elevator control system, a motor, a line circuit and a dynamic brake circuit therefor, means including a plurality of switches for varying the condition of said circuits, means for controlling some of said switches from a car, and means for automatically controlling the remaining switches by the load on the motor, the connections for said last named switches being arranged to actuate said switches successively and in a determined order only after the actuation of the switches controlled from the car.

49. In an electric elevator control system, a line circuit and a dynamic brake circuit, means including a plurality of switches for varying the condition of said circuits, connections for controlling some of said switches from a car, connections for others of said switches arranged to be closed only in a determined order after the actuation of said manually controlled switches, and connections for at least one switch, which connections are independent of said manually controlled switches, the actuation of said last named switch controlling the actuation of said switches other than the manually controlled switches.

50. In an electric elevator control system, a motor, a main line circuit and a dynamic brake circuit therefor, means for short-circuiting a part of said dynamic brake circuit, including an electrically operated switch, means for actuating said switch including a circuit bridged across the motor terminals, and means for retarding the action of said switch including a circuit in parallel to the main line circuit.

51. In an electric elevator control system, a motor, a line circuit, up and down switches for connecting said motor to the line circuit, controlling circuits for said switches, and an electrically actuated device connected with the main line circuit for opening said controlling circuits.

52. In an electric elevator control system, a motor, a line circuit, up and down switches for connecting said motor to said line circuit, controlling circuits for said switches controlled by a car switch, an electrically operated device having two windings thereon for opening said controlling circuits, one of said last named windings being of low resistance and connected to the main line circuit, the other of said windings being of high resistance and connected in parallel to the controlling circuit, the current passing through said high resistance winding being sufficient to hold the electrically actuated device in its actuated position, but not to hold the up and down switches in their actuated positions, said last named controlling circuit being controlled by a circuit breaker switch in the car.

53. In an electric elevator control system, a motor, a line circuit, up and down switches for connecting said motor to said line circuit, a control circuit for said switches controlled by a car switch, an electrically operated switch for opening said controlling circuits having a coil comprising two windings, one of said windings being of low resistance and connected to the main line circuit, the other of said windings being of high resistance and connected in parallel to said controlling circuit, means for opening said controlling circuit upon an overload of current in the main line, an auxiliary controlling circuit controlled by the up and down switches adapted to be closed upon an actuation of said switches, both of said controlling circuits having a common path controlled by said electrically actuated device, and a third controlling circuit, including a circuit-breaker switch in the car, passing through said high resistance winding of the said electrically actuated switch and adapted to open the same upon the opening of the circuit breaker switch in the car.

54. In an electric elevator control system, a motor, a line circuit, up and down switches for connecting said motor to said line circuit, a control circuit for said switches controlled by a car switch, an electrically operated switch for opening said controlling circuits having a coil comprising two windings, one of said windings being of low resistance and connected to the main line circuit, the other of said windings, being of high resistance and connected in parallel to said controlling circuit, means for opening said controlling circuit upon an overload of current in the main line, an auxiliary controlling circuit controlled by the up and down switches adapted to be closed upon an actuation of said switches, both of said controlling circuits having a common path controlled by said electrically actuated device, a third controlling circuit including a circuit-breaker switch in the car, passing through said high resistance winding of the said electrically actuated switch and adapted to open the same upon the opening of the circuit-breaker switch in the car, and a resetting magnet included in said last named control circuit.

55. In an electric elevator control system, a motor, a line circuit, up and down switches for connecting said motor to said line circuit, controlling circuits controlled by a car switch for said up and down switches, an electrically operated switch for opening said control circuits, said last named switch having a low and high resistance winding, said low resistance winding being connected to the main line circuit, and a circuit passing through said high resistance winding controlled by a switch in the car, the current passing through said high resistance winding being sufficient to maintain said electrically operated switch actuated, but not to maintain said up and down switches in their attracted position.

56. In an electric elevator control system, a motor, a line and a dynamic brake circuit therefor, means including a plurality of switches for varying the resistance of said line and dynamic brake circuit, means controlled by a car switch for controlling some of said switches, and means controlled by the load upon the motor for automatically controlling other of said switches.

57. In an electric elevator control system, a motor, a line and a dynamic brake circuit therefor, means including a plurality of switches for varying the resistance of said line and dynamic brake circuits respectively, means controlled by a car switch for controlling some of said switches, and means controlled by the line circuit when the same is delivering current to the motor and by the counter-E. M. F. of the motor when the same is acting as a generator for automatically controlling the other of said switches.

58. In an electric elevator control system, a motor, a line and a dynamic brake circuit therefor, a plurality of switches for controlling the current passing through said circuits, means for controlling some of said switches from the car, pilot switches for controlling a part of the remaining switches, and means including circuits connected in series with at least the main part of said dynamic brake circuit for controlling said pilot switches and the remaining switches.

59. In an electric elevator control system, a motor, a line circuit therefor, means including at least one switch controlled from the car for increasing the supply of current to the line circuit, means including a switch controlled by the load on the motor for also increasing the supply of current to the line circuit, and means including a plurality of switches for further increasing the supply of current to the line circuit, the actuation of said last named switches being dependent upon the actuation of said two first named switches.

60. In an electric elevator control system, a motor, a shunt field therefor, a line circuit for said motor, means for varying the strength of said field comprising an electrically controlled switch, means for normally actuating said switch by the current in the line circuit of the motor, and means controlled by a car switch for deënergizing said switch to thereby increase the speed of the motor.

61. In an electric elevator control system, a motor having a shunt field, a line circuit for said motor, means including an electrically operated switch for decreasing the strength of said field when energized, a control circuit for said switch in parallel with the line circuit, and circuits controlled by the car switch for opposing the current passing through said control circuit to deënergize said switch and thereby weaken the field of the motor to increase its speed.

62. In an electric elevator control system, a motor, a line circuit therefor, a shunt field for said motor, means including an electromagnetically operated switch for decreasing the strength of said field when energized, a control circuit for said switch having a coil in parallel to the main line circuit, connections to said control circuit on each side of said coil controlled by the car switch for opposing the current passing through said coil irrespective of a reversal of current in the line circuit.

63. In an electric elevator control system, a motor, a line circuit therefor, means including a plurality of switches for varying the resistance of said line circuit, and means for actuating said switches in one order as the motor is starting and in a reverse order but in different succession when the motor is stopping.

64. In an electric elevator control system, a motor, a line and a dynamic brake circuit therefor, means including a plurality of switches for varying the resistances of said line and dynamic brake circuits, and means for actuating said switches in one order as the motor is starting and in a different order when the motor is stopping.

In witness whereof, we subscribe our signatures in the presence of two witnesses.

NILS O. LINDSTROM.
CARL F. E. OLOFSON.

Witnesses:
WALDO M. CHAPIN,
MARY G. HART.